US010232955B2

(12) United States Patent
Benedetto et al.

(10) Patent No.: US 10,232,955 B2
(45) Date of Patent: Mar. 19, 2019

(54) PORTABLE BALLOON LAUNCH RIG

(71) Applicant: LOON LLC, Mountain View, CA (US)

(72) Inventors: Joseph Charles Benedetto, Canton, GA (US); Olivia Hatalsky, San Jose, CA (US); John Frederick Udall, Redwood City, CA (US); Liang-Shian Chen, Milpitas, CA (US); Chase R. Haegele, San Francisco, CA (US); Daniel Patrick Bowen, Palo Alto, CA (US); C. O. Lee Boyce, Jr., Mountain View, CA (US); Shane Washburn, Oakland, CA (US); Keegan Gartner, San Jose, CA (US)

(73) Assignee: LOON LLC, Mountain View, CA (US)

( * ) Notice: Subject to any disclaimer, the term of this patent is extended or adjusted under 35 U.S.C. 154(b) by 338 days.

(21) Appl. No.: 15/165,616

(22) Filed: May 26, 2016

(65) Prior Publication Data

US 2017/0267376 A1 Sep. 21, 2017

Related U.S. Application Data

(60) Provisional application No. 62/310,370, filed on Mar. 18, 2016.

(51) Int. Cl.
*B64B 1/40* (2006.01)
*B64F 1/04* (2006.01)
(Continued)

(52) U.S. Cl.
CPC ............... *B64F 1/04* (2013.01); *B64B 1/005* (2013.01); *B64B 1/40* (2013.01); *B64B 1/58* (2013.01);
(Continued)

(58) Field of Classification Search
CPC .. B64B 1/005; B64B 1/40; B64B 1/66; B64C 2201/022; B64C 2201/101; B64F 1/04;
(Continued)

(56) References Cited

U.S. PATENT DOCUMENTS 1,465,246 A * 8/1923 Leo ........................... B64F 1/14
244/116
1,770,675 A * 7/1930 Short ........................ B64F 1/14
244/116
(Continued)

FOREIGN PATENT DOCUMENTS

GB   191311223 A  * 12/1913  ............... E04H 6/44
GB       865590 A     4/1961
WO   2015123500 A1    8/2015

OTHER PUBLICATIONS

Dent, Steve. "Project Loon shows off autolauncher at work in Puerto Rico." <https://www.engadget.com/2016/02/26/project-loon-autolauncher-peurto-rico/>. Published on Feb. 26, 2016. 15 pages.
(Continued)

*Primary Examiner* — Richard R. Green
(74) *Attorney, Agent, or Firm* — Botos Churchill IP Law LLP

(57) ABSTRACT

A portable launch rig (PLR) may include a support structure including two side supports defining an interior space for lifting and filling a balloon envelope of a balloon. Wheels on each of the side supports enable the PLR to be moved in various directions in order to prepare the PLR for launching the balloon. The side supports are connected by a lateral support beam having a pair of cranes arranged thereon. Each crane has an arm arranged over the interior space that is connected to a spreader beam. The spreader beam includes a lift assembly configured to lift and inflate the balloon envelope within the interior space. The PLR includes a platform and perch for supporting and moving the balloon
(Continued)

envelope. A door assembly of the PLR includes a plurality of hangar doors configured to block wind from a respective direction of each hangar door entering the interior space.

10 Claims, 27 Drawing Sheets

(51) Int. Cl.
    *B64F 1/14*     (2006.01)
    *B64B 1/58*     (2006.01)
    *B64F 1/36*     (2017.01)
    *B64B 1/00*     (2006.01)

(52) U.S. Cl.
    CPC .......... *B64F 1/14* (2013.01); *B64F 1/36* (2013.01); *B64C 2201/022* (2013.01); *B64C 2201/088* (2013.01); *B64C 2201/122* (2013.01)

(58) Field of Classification Search
    CPC ..... B64F 1/12; B64F 1/14; E04H 6/44; E04B 1/342
    See application file for complete search history.

(56) References Cited

U.S. PATENT DOCUMENTS

| | | | |
|---|---|---|---|
| 1,823,289 A * | 9/1931 | Powelson | B64F 1/14 244/115 |
| 3,452,949 A | 7/1969 | Maloney et al. | |
| 9,266,599 B1 | 2/2016 | Ratner | |
| 2009/0224094 A1 | 9/2009 | Lachenmeier | |

OTHER PUBLICATIONS

Project Loon: Scaling Up. YouTube video can be viewed at: <https://www.youtube.com/watch?v=HOndhtfIXSY>. Published on Apr. 17, 2015. 13 pages.

Examination Report No. 1 for Australian Patent Application No. 2016203601, dated Jan. 31, 2017. 8 pages.

Project Loon Google+ post Feb. 25, 2016 https://plus.google.com/u/0/+ProjectLoon/posts/HaRocUbUSae.

* cited by examiner

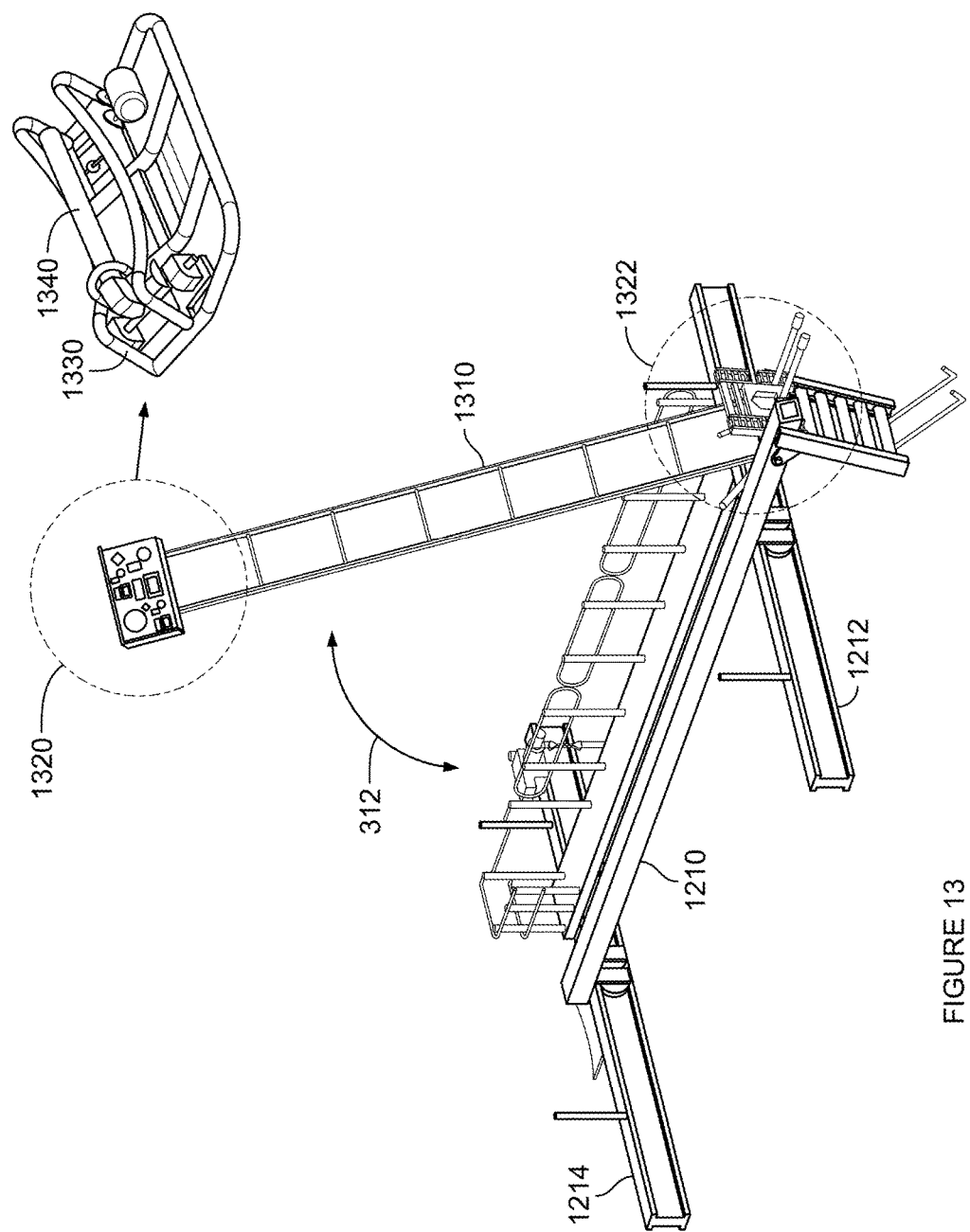

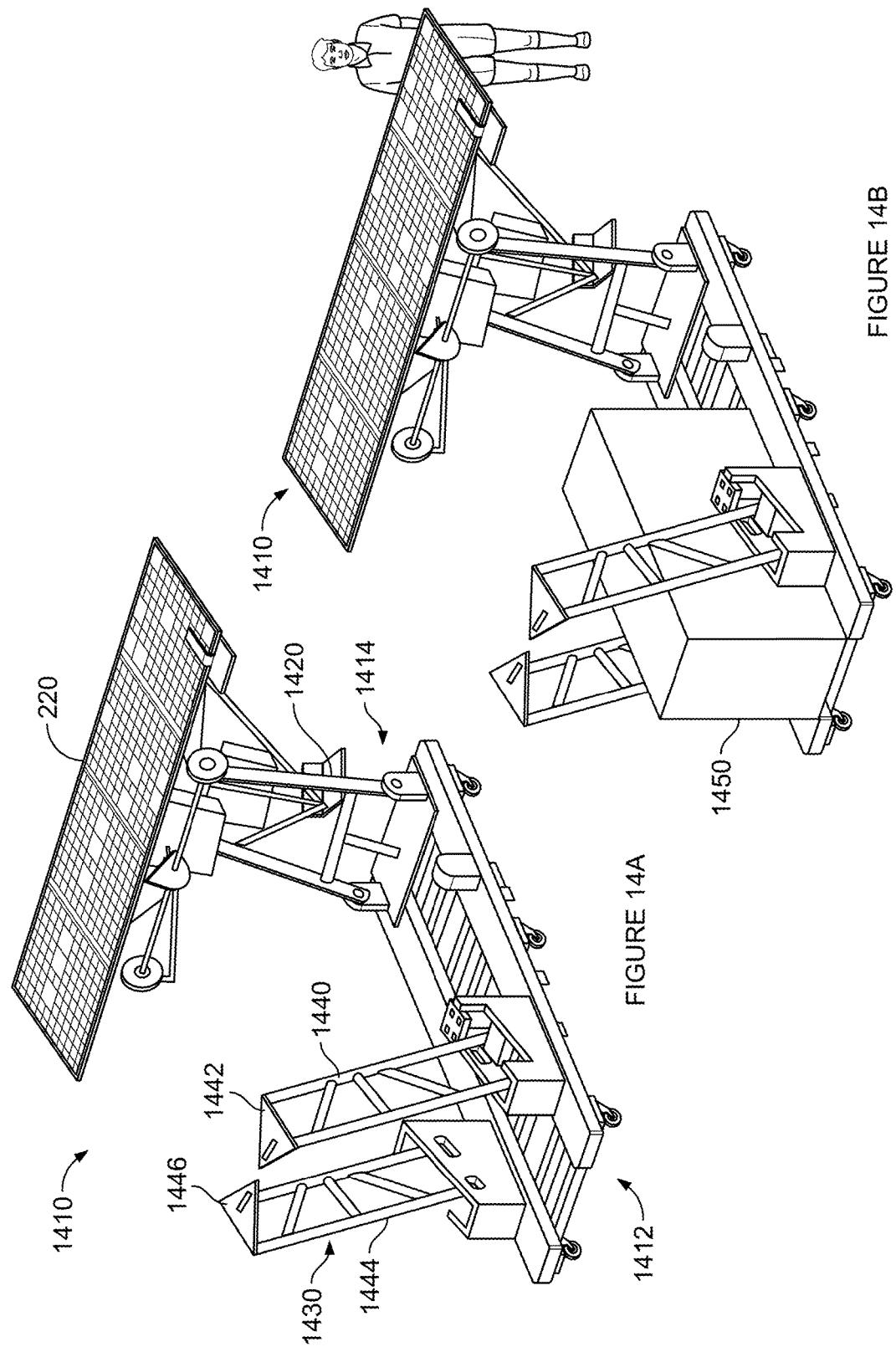

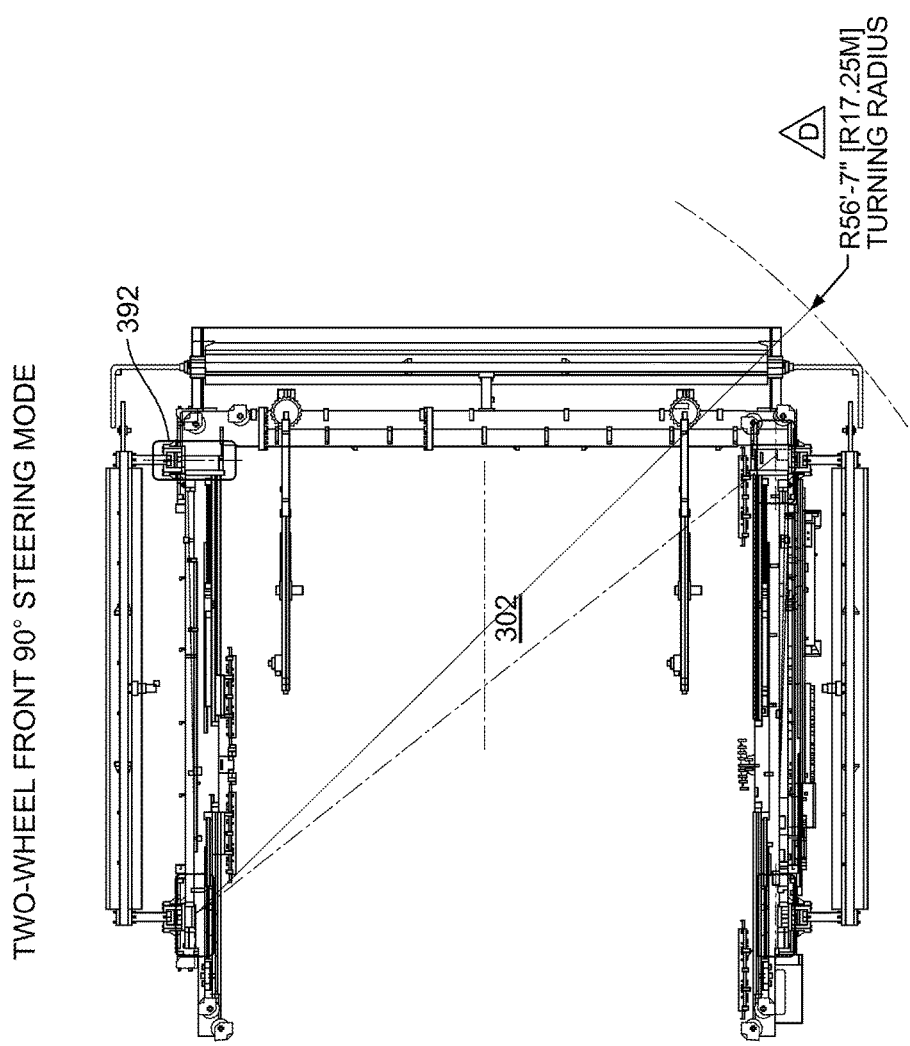

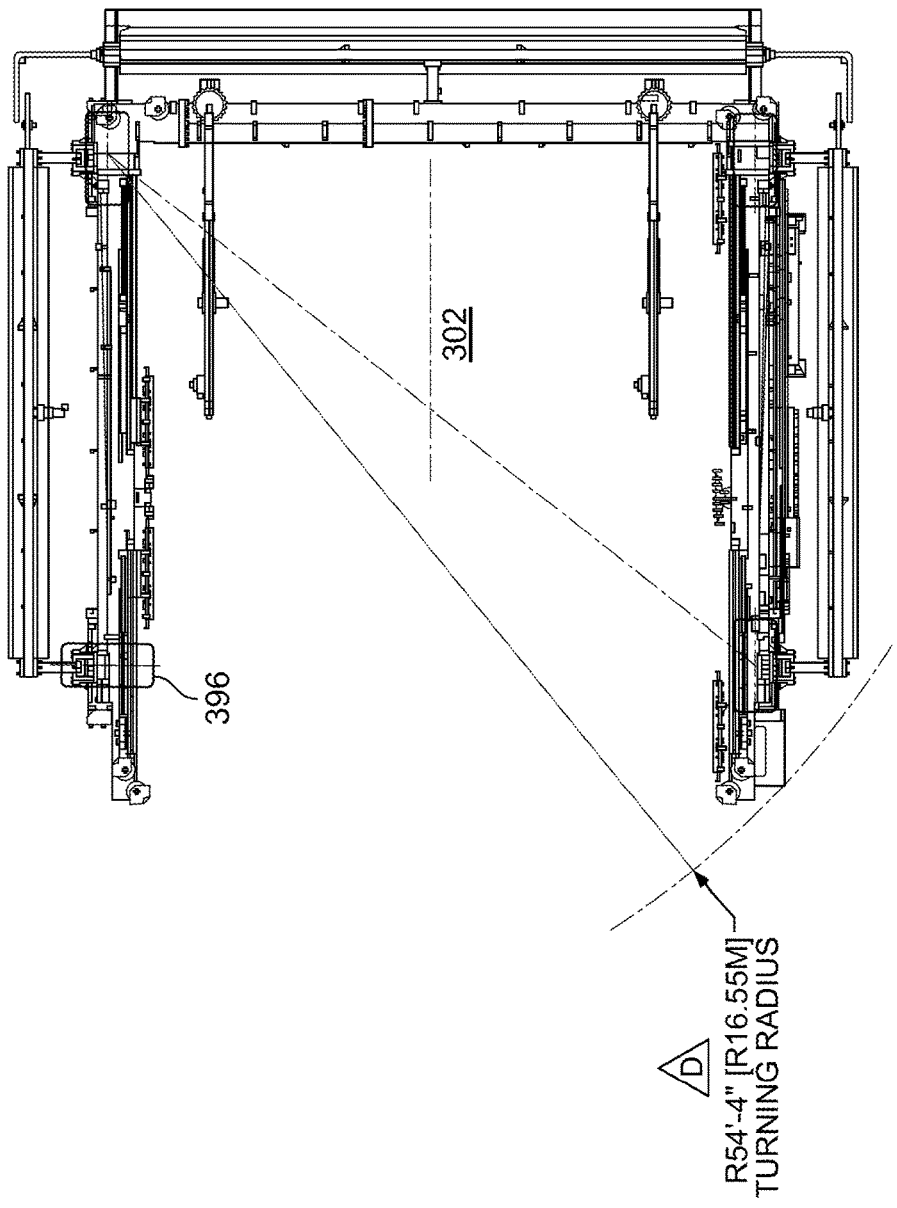

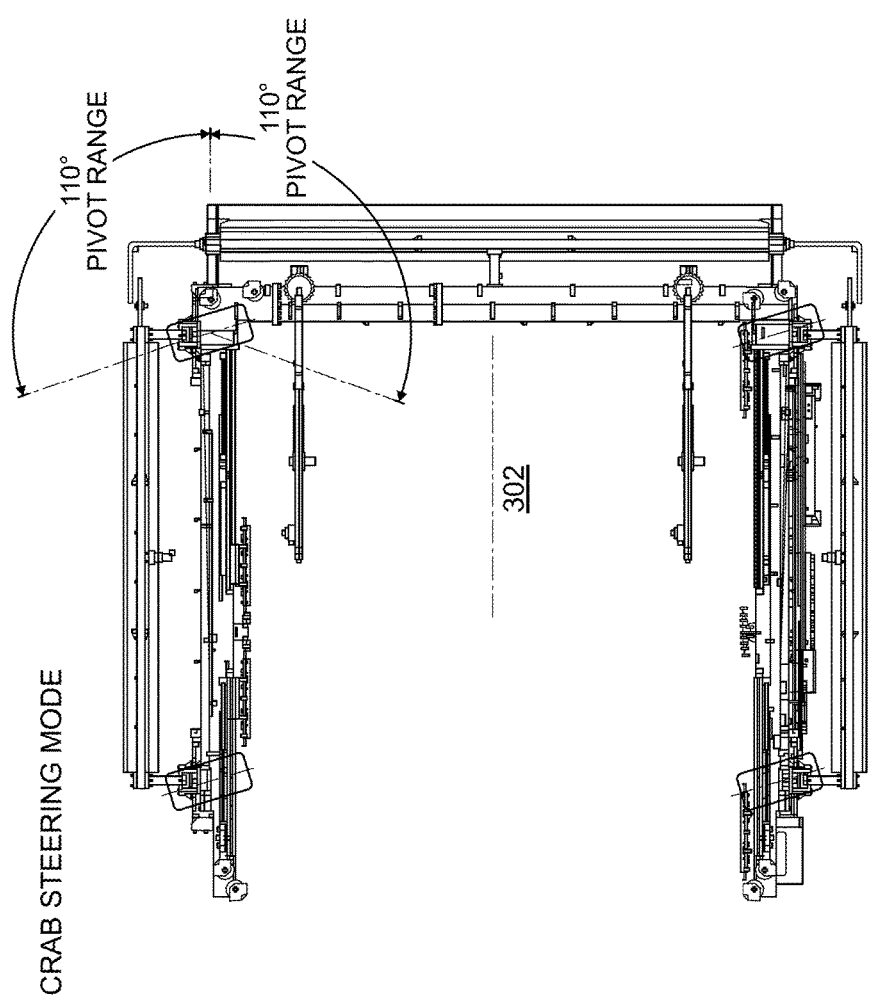

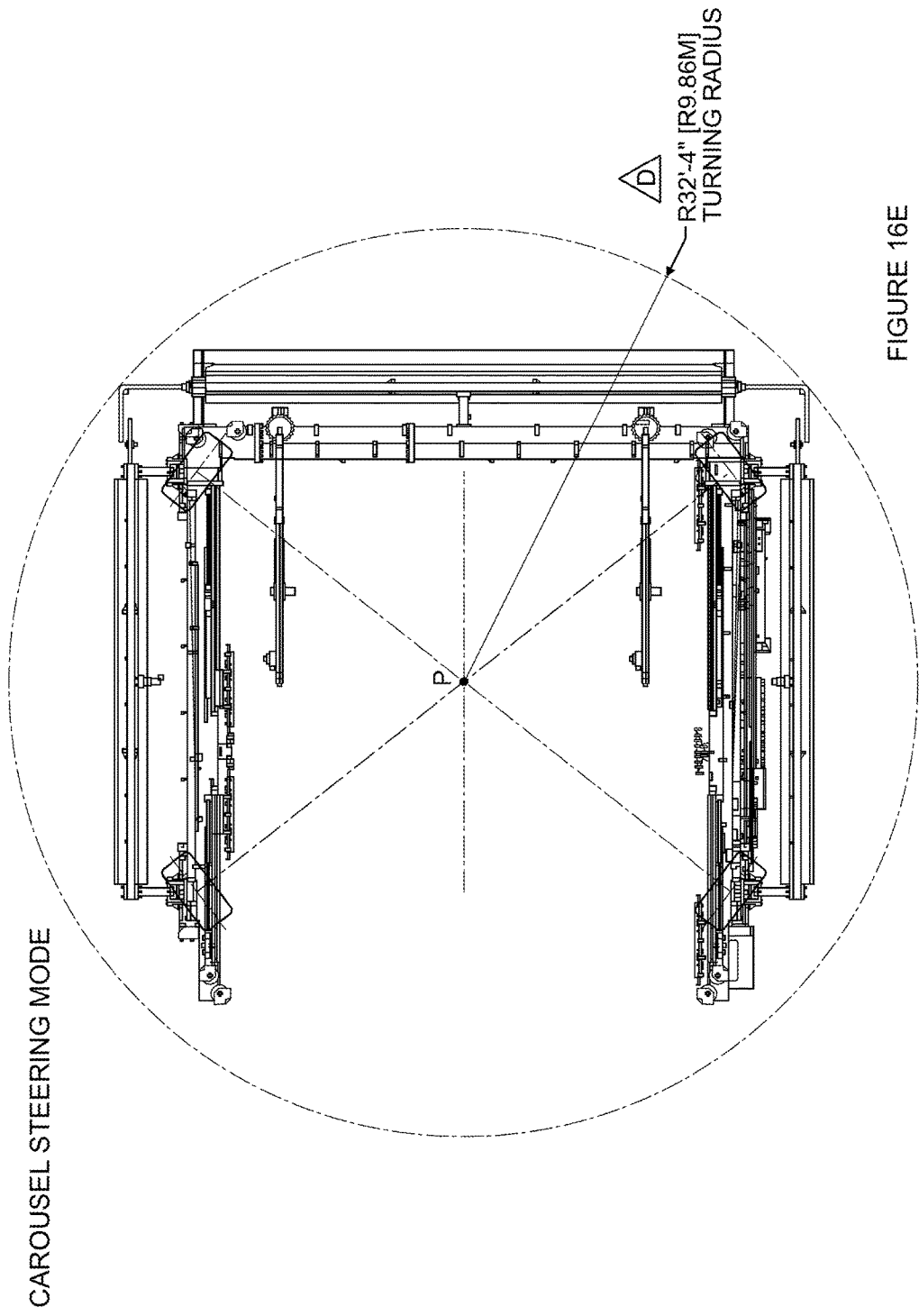

PORTABLE BALLOON LAUNCH RIG

CROSS-REFERENCE TO RELATED APPLICATION

The present application claims the benefit of the filing date of U.S. Provisional Patent Application No. 62/310,370 filed Mar. 18, 2016, the entire disclosure of which is incorporated by reference herein.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. These networks may include a large number of high-altitude balloons inflated with lighter than air lift gas and deployed from the ground.

Deploying such balloons under other than ideal weather condition can become very difficult. For example, launching such balloons in a windy environment can be potentially hazardous to bystanders, and in some cases, windy conditions can cause damage to the balloons before they are fully inflated and deployed. Solutions such as using a wind shield to block wind from one direction are less useful when wind changes direction and may have to be constantly adjusted. Tubular towers which protect balloons during inflation may work well until a balloon is actually launched and moves out of the exit at the top of the tower. A strong cross wind can cause the balloon to hit the exit of the tower potentially damaging the balloon. Similarly, launching a balloon from a structure such as a warehouse or hangar may work well until the balloon leaves the protection of the structure and into windy conditions.

BRIEF SUMMARY

Aspects of the present disclosure are advantageous for high altitude balloon systems. In one example, a method of launching a balloon including a balloon envelope and payload. The method includes positioning the balloon envelope at least partially within a support structure having two rectangular supports connected by a lateral support beam and a set of wheels, attaching a releasable restraint to the balloon envelope in order to temporarily secure the balloon envelope to a first end of a perch within the support structure, positioning a lift assembly over a top plate of the balloon using a pair of jib cranes arranged on the lateral support beam, attaching the lift assembly to the balloon envelope within an interior space of the support structure, inflating the balloon envelope with lift gas, adjusting the position of the support structure by controlling the set of wheels according to current wind conditions in order to prepare the support structure for launching of the balloon, releasing the inflated balloon envelope from the lift assembly, releasing the releasable restraint in order to release the balloon from the perch, and completing a launch of the balloon.

In one example, the method also includes temporarily securing the payload prior to inflation by applying a clamp structure to a base plate of the balloon, wherein the clamp structure is arranged at a second end of the perch. In this example, the method can include, after releasing the releasable restraint, releasing the clamp structure in order to release the balloon from the perch and complete the launch of the balloon. In another example, the jib cranes are attached to a jib spreader bar and the lift assembly is attached to the jib spreader bar, such that positioning the lift assembly includes operating the jib cranes in order to move the jib spreader bar. In this example, inflating the balloon with lift gas includes providing a lift gas supply along the spreader bar and through the lift assembly. In another example, the method also includes, prior to releasing the releasable restraint, swinging the perch away from a platform in order to raise the position of the top plate. In this example, the platform is attached to two lateral support bars suspended from the support structure, and adjusting the position of the support structure includes moving the lateral support bars relative to the support structure. In another example, a door assembly including a plurality of hangar doors is attached to the support structure, and the method further comprises closing the plurality of hangar doors in order to block wind from the interior space. In this example, the support structure includes four open lateral sides, a top opening and a bottom opening, the plurality of hangar doors comprises three doors on three of the four lateral sides of the support structure, and adjusting the position of the support structure includes moving a fourth side of the four lateral sides without a door into a downwind position. In another example, the method also includes adjusting the position of the support structure by controlling the set of wheels in response to a change in the current wind conditions in order to prepare the support structure for launching of the balloon;

Another aspect of the disclosure provides a system for lifting, inflating and launching a balloon including a balloon envelope. The system includes a support structure including two side supports defining an interior space for lifting and filling a balloon envelope. Each side support including two side beams connected by top support beams and bottom support beams, and the bottom support beams each include two wheels configured to move the support structure. the side supports are connected by a lateral support beam. The system also includes a pair of cranes arranged on the lateral support beam, each crane of the pair having an arm arranged over the interior space. The system also includes a spreader beam attached to the arm of each of crane of the pair by a respective crane cable such that the respective crane cables can raise and lower the spreader beam relative to the support structure. The spreader beam includes a lift assembly configured to lift and inflate the balloon envelope within the interior space. The system also includes a platform having a pair of lateral support bars. Each lateral support bar of the pair is connected to each of the top support beams by a respective support bar cable such that the respective support bar cables can be operated to raise and lower the platform relative to the interior space. The system also includes a door assembly attached to the support structure. The door assembly includes first, second, and third hangar doors configured to block wind from a respective direction of each hangar door entering the interior space during lifting and inflating of the balloon envelope.

In one example, the platform includes a perch having a first end including a releasable restraint, a second end of the perch being configured to pivot relative to the platform in order to move the releasable restraint away from the platform. In this example, a first end of the perch includes a releasable restraint for temporarily securing the balloon envelope to the perch within the interior space during the inflating of the balloon envelope. In another example, the system also includes a lift gas supply apparatus configured to attach to a lift gas supply line of the lift assembly. In another example, the support structure includes support structure includes four open sides defined by one of the side supports on a first of the open sides, one of the side beams of each of the side structures and the lateral support beam on a second of the four open sides, another of the two side supports on a third of the four open sides, and another of the side beams of each of the side structures on a fourth of the four open sides. In this example, the first hangar door is arranged to block wind from the direction of the first of the four open sides, the second hangar door is arranged to block wind from the direction of the second of the four open sides, and the third hangar door is arranged to block wind from the direction of the third of the four open sides. In addition, the door assembly includes a first side curtain between the first and second hangar doors and a second side curtain between the second and third hangar doors. In addition or alternatively, the platform includes a perch configured to pivot relative to the platform in order to move the balloon towards the fourth of the four open sides after inflating the balloon envelope. Again, in addition or alternatively, the two wheels of each of the bottom support beams are configured to rotate the support structure in order to move the fourth of the open four sides downwind. In another example, each wheel of the two wheels of each of the bottom support beams includes an independent drive system such that each wheel of the two wheels of each of the bottom support beams can be rotated and pivoted independently of other wheels of the two wheels of each of the bottom support beams. In another example, the system also includes the balloon.

BRIEF DESCRIPTION OF THE DRAWINGS

FIG. 13 is an example of the platform, perch, and a releasable restraint in accordance with aspects of the disclosure.

FIGS. 14A and 14B are an example cart in accordance with aspects of the disclosure.

FIGS. 16A-16E are example top down views of the portable launch rig depicting example steering configurations in accordance with aspects of the disclosure.

DETAILED DESCRIPTION

Overview

Figure 1:
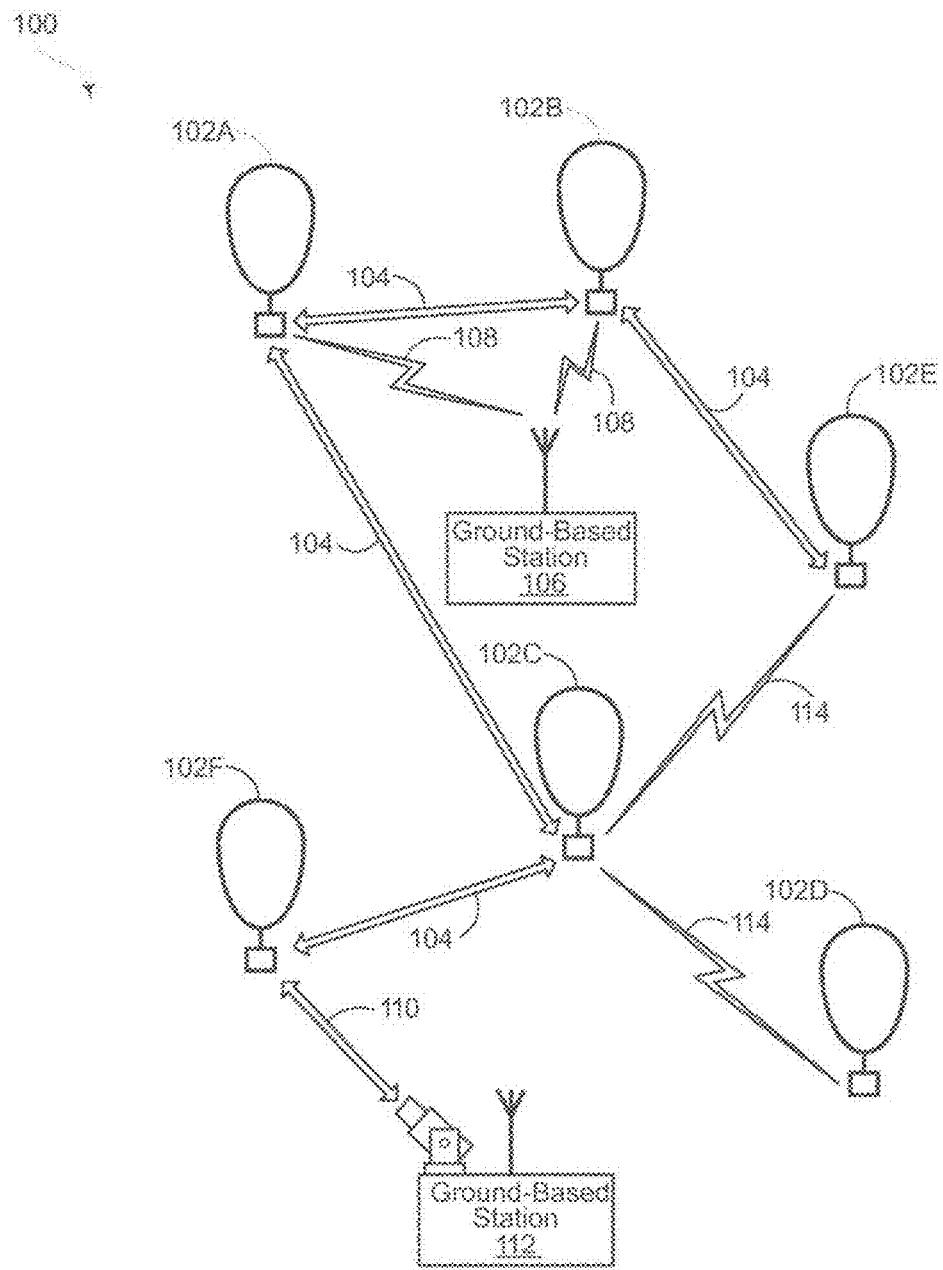
FIG. 1 is a functional diagram of a system in accordance with aspects of the disclosure.

The technology relates to launching high altitude balloons, and in particular, in windy environments or environments with changing wind conditions. As an example, a typical balloon may include a balloon envelope having a top plate and a base plate, a plurality of tendon between the top plate and the base plate, and a payload. Because of the size and expense of such balloons it can be difficult to safely launch such balloons in high wind environments. In the past, launches have been aided by using peanuts (specialized clamps for launching high-altitude balloons), wind shields, tubular towers with top openings, or from generally enclosed structures such as a warehouse or hangar. Each of these may have significant draw backs based upon their configurations which can cause balloon launches to be slow, unpredictable, and potentially damaging to the balloons. To address these drawbacks, a specialized portable launch rig (PLR) may be used.

As an example a PLR may include a support structure surrounding an interior space configured for inflating and launching of balloons. The support structure may include two rectangular supports at opposite sides of the support structure. Each rectangular support includes two parallel side supports and parallel top and bottom beams. A lateral support beam may connect the rectangular support structures to one another at the parallel side supports on a back side of the support structure. A fourth side of the support structure is framed by the two parallel side beams and is generally open in order to permit a balloon to be moved into and out of the support structure for inflating and launching.

The support structure may also include a one or more jib cranes for lifting and inflating of the balloons. In one example, the support structure may include first and second jib cranes mounted to a top surface of the lateral support beam. Each jib crane includes a cable that extends downward towards the interior space. At the end of each jib crane cable is a connection for connecting to a beam or jib spreader. Each cable is controlled by a corresponding hoist which may operate to extend and retract the cables of the first and second jib crane in order to lower and raise the jib spreader. In order to keep the jib spreader parallel with respect to the ground, the hoists may operate in unison or independently using a single controller.

The jib cranes may each include a first arm portion and a second arm portion. The first arm portions may be connected to the lateral support beam and extend upwards from and generally perpendicularly to the lateral support beam. The second arm portions may be connected to the respective first arm portions and extend over the interior space.

In order to increase the range of movement of the jib spreader, the jib cranes may also be moveable in multiple degrees of freedom. For instance, each of the first arms of the jib cranes may be extended or retracted towards and away from the lateral support beam using a hydraulics system. The second arms may also be pivoted and rotated relative to the first arms. In addition, as with the first arms, the second arms may also be extended and retracted.

The jib spreader may include a mount for connecting an assembly for lifting a balloon. The assembly may also be configured to provide lift gas into the balloon envelope through an opening in the top plate of the balloon. In that regard, electrical and lift gas lines may be connected to the assembly from the jib spreader.

In order to provide wind protection to the interior space, the support structure may include a three-sided door assembly. The door assembly may include retractable hangar doors each set within a corresponding rectangular hangar door frame. When fully extended, these hangar doors are configured to block the wind from the interior space from the corresponding side of the support structure, while leaving a fourth side of the PLR open. When fully retracted, the doors may be rolled up completely or almost completely inside of three respective door housings arranged adjacent to the parallel top beams and lateral support beam. These rolling doors allow the PLR's support structure to withstand higher wind conditions without imposing higher wind loads on the support structure.

An order to lift, fill and launch the balloons, a platform may be arranged within the interior space. The platform may include two lateral support bars which are each connected by two cables to a corresponding one of the parallel top beams of the support structure. Each cable may be controlled by a corresponding hoist which may operate to extend and retract the corresponding cable in order to lower and raise lateral support bars towards and away from the parallel top beams thereby raising and lowering the platform. The hoists may operate in unison or independently and can be used to raise and lower the platform completely independent of the cables of the jib cranes and/or in unison with the hoists of the jib cranes.

The platform may be or may include a movable perch. The perch can pivot relative to the platform in order to lift the balloon during inflation as well as to move and lift the balloon during launch. A first end of the perch includes a releasable restraint for holding a portion of the balloon envelope to the perch during inflation and prior to launch. The second end of the perch may be configured for attachment with the payload of a balloon. For example, the second end may include a payload positioning assembly including two arms having end portions which are configured to clamp onto a portion of the balloon as well as a rest structure for holding the payload prior to launch. The payload positioning assembly may position or maintain the position of the payload until the releasable restraint has been released and the balloon envelope has reached a certain height or location relative to the payload where the payload is ready to be released. This reduces the likelihood that the payload will collide with the perch, platform, or ground after the payload is released during a launch.

In another example, the second end of the perch and/or the platform may include a connection member for connecting with a cart. On end of the cart may include a rest structure for holding the balloon's payload to the perch during inflation and prior to launch. The cart is may be used to move a boxed balloon towards the support structure. A second end of the cart may include a payload positioning assembly including two arms having end portions which are configured to clamp onto a portion of the balloon.

As noted above, the PLR may be used not only to launch a balloon, but also the fill the balloon. In this regard, a lift gas supply may be provided. The lift gas supply may be integrated into the support structure in order to reduce the likelihood of kinking of the lift gas supply line when the support structure is moved. Alternatively, the lift gas supply may be an independent assembly, such as a lift gas supply cart. Again, in order to reduce kinking of the lift gas supply line when the support structure is moved, the lift gas supply cart may be configured to connect and move with the support structure.

The PLR is also configured to change the position and orientation of the support structure. Each of the bottom beams may include two or more wheels each having an independent hydraulics system to turn (angle) and rotate (drive) that wheel. The independent movement of each wheel allows the PLR to have many different types of movement such as 2-wheel and 4-wheel drive modes as well as various steering modes. By changing the orientation of the wheels, the PLR can always be maneuvered such that the fourth open side of the PLR can be rotated to downwind as wind conditions at a launch site change.

The various features of the PLR may be electrically connected to a control system. Various user inputs may be included within a cab. These user inputs may allow a human operator to communication with the control system in order to control the movement and position of the wheels, platform, perch, releasable restraint, payload positioning assembly, jib cranes, hangar doors, as well as various other features of the PLR.

The PLR may include a data acquisition system. The data acquisition system may include various sensors arranged to detect the position and location of the wheels, platform, perch, releasable restraint, payload positioning assembly, jib cranes, hangar doors, as well as various other features of the PLR. The PLR may also include a plurality of sensors configured to detect and provide information regarding current wind conditions outside of the PLR and also within the interior space. In addition, the control system may also communicate with the lift gas supply cart to control the inflation of a balloon envelope. These sensors may send information to the control system which processes the information and provides it for display, for example, on an electronic display within the cab to the operator.

In addition, the control system may be configured to send information to a remote computer via a communication link so that an operator outside of the cab may still be able to control the movement and position of the wheels platform, perch, releasable restraint, payload positioning assembly, jib cranes, hangar doors, as well as various other features of the PLR.

As noted above, the PLR may be used to lift, fill and launch a balloon. In order to do so, at least a portion of the balloon may be positioned within the interior space. A box containing a balloon may be placed on the perch within the interior space. The payload may be placed on the rest and the end portions of the arms may be clamped onto the base plate. In addition, the roller bar of the releasable restraint may be clamped onto the balloon envelope and slid towards the first end of the perch and into the interior space.

In order to lift the balloon out of the box, the jib spreader may then be positioned over and lowered towards the box. The assembly for lifting the balloon may then be secured to the top plate. The hoists of the jib cranes may then retract the cables in order to raise the jib spreader and pull the balloon envelope out of the box.

Prior to or once the assembly is secured to the top plate the lift gas supply cart (if used) may be wheeled over to the support structure and connected to the lift gas line. Lift gas from the supply cart may then flow into the balloon envelope via the lift gas line and assembly, until the inflating is complete or the desired inflation pressure is reached within the balloon envelope.

Prior to, during and after the inflation, the features of the PLR may be moved in order to obtain the best possible launch conditions as wind conditions around the PLR change. For example, the hangar doors may be lowered to reduce the wind within the interior space. Even in situations where the direction of the wind changes, the drive and steering examples above may be used to change the position of the PLR so that the front side is downwind. This can even further reduce the amount of wind within the interior space. In addition, the platform and/or jib spreader may be raised or lowered in order to raise or lower the position of the top plate (and balloon envelope) and the angle of the perch changed in order to best position the balloon envelope for the current wind conditions at launch.

Once the inflating is complete and the PLR is positioned for the current wind conditions, the balloon may be ready for launch. At this point, the top plate may be released from the assembly. At the same time or shortly thereafter, the assembly may be pulled away from the top plate. At launch, the first end of the perch is swung upwards. Next, the balloon envelope is released from the releasable restraint by swinging the roller bar away from the releasable restraint. This causes the balloon envelope to begin to rise away from the first end of the perch. At an appropriate time thereafter, such as when the balloon envelope has passed over (or beyond) the payload, the end portions of arms may be released from the base plate. The arms may swing away from the base plate, allowing the balloon (including the payload) to float away and completing the launch.

Example Balloon System

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." The system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
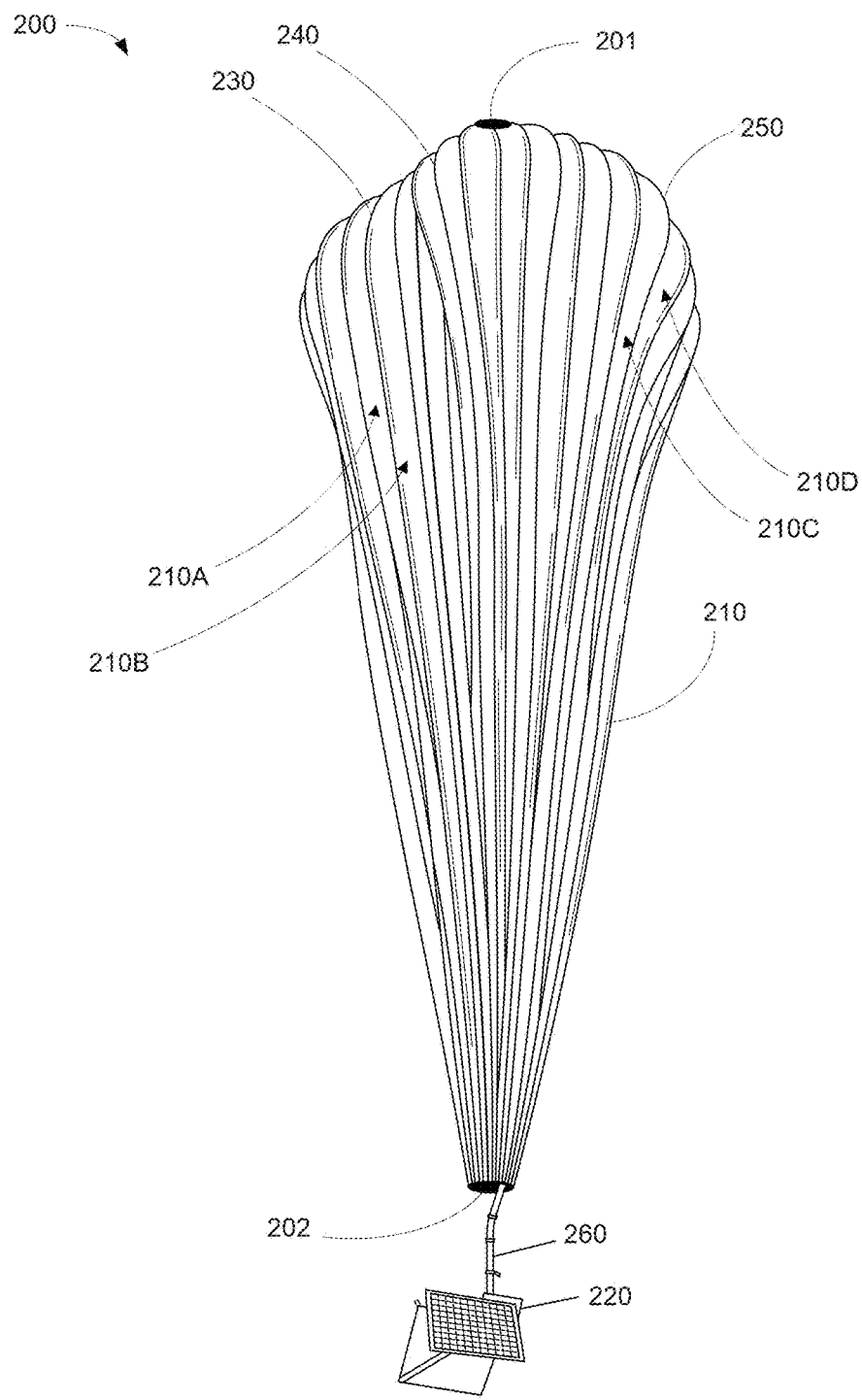
FIG. 2 is an example of a balloon in accordance with aspects of the disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable or other rigid structure. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap, or top plate, 201 positioned at the apex of balloon envelope 210. Bottom ends of the tendons 230, 240 and 250 may also be connected to one another. For example, a corresponding apparatus, e.g., bottom cap 220, may be disposed at a base or bottom of the balloon envelope 210. The top plate 201 at the apex may be the same size and shape as and bottom cap 220 at the bottom. Both caps include corresponding components for attaching the tendons 230, 240 and 250 to the balloon envelope 210.

Example Launch System

Figure 3:
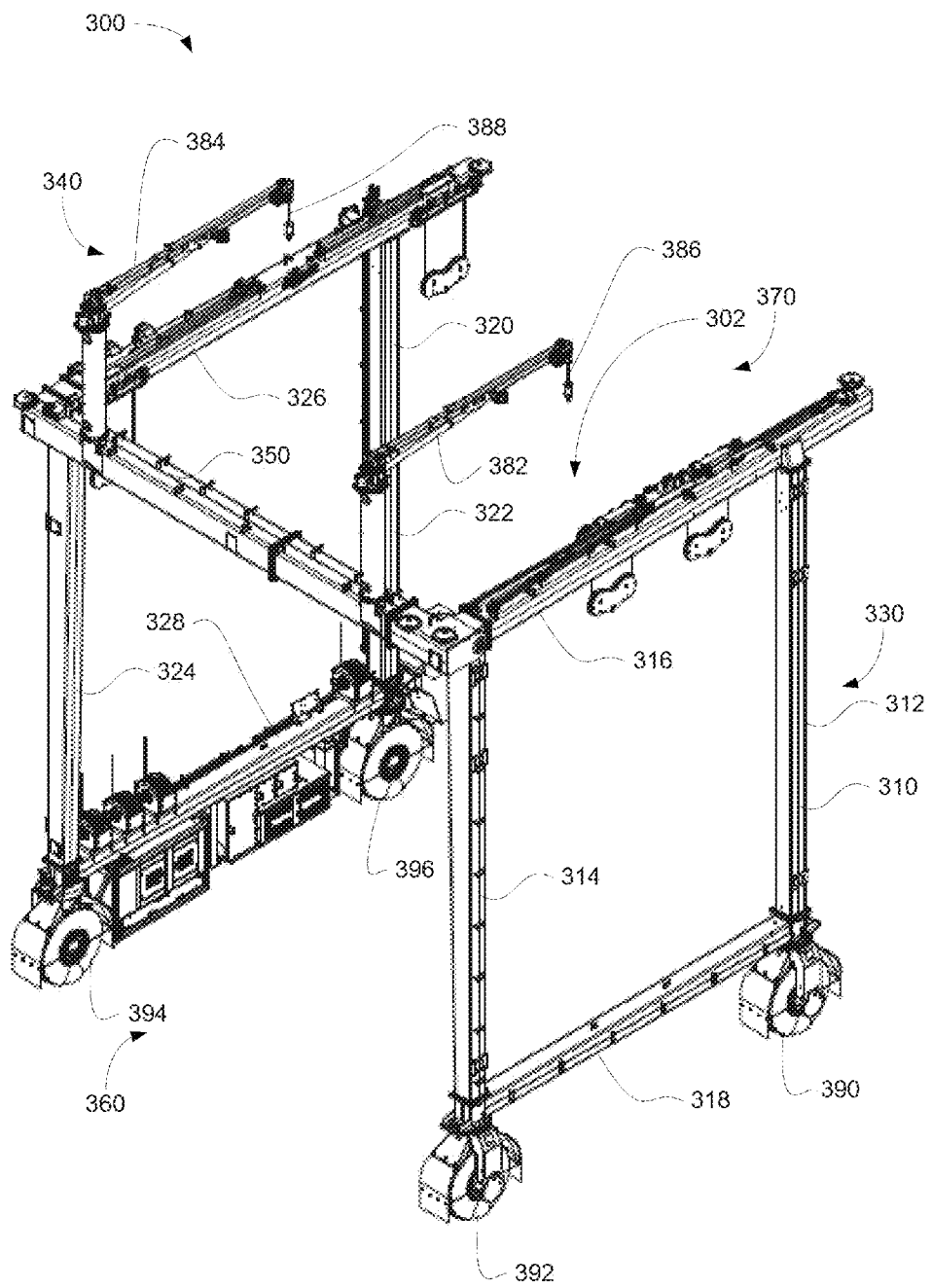
FIG. 3 is an example perspective view of a support structure in accordance with aspects of the disclosure.

As shown in FIG. 3, an example PLR includes a support structure 300 surrounding an interior space 302 configured for inflating and launching of balloons. Thus, as an example, the support structure may be approximately 45 feet height, 35 feet wide and 40 feet in depth. The support structure 300 may include two rectangular supports 310, 320 on opposing left and right sides 330, 340, respectively, of the support structure. Each rectangular support includes two parallel side supports 312, 314, 322, 324, parallel top beams 316, 326, and parallel bottom beams 318, 328. In this regard, parallel side beams 312, 314, top beam 316, and bottom beam 318 form a first one of the rectangular supports. Similarly, parallel side beams 322, 324, top beam 326, and bottom beam 328 form a first one of the rectangular supports.

A lateral support beam 350 connects the rectangular support structures at the parallel side supports 314, 324 to one another on a third, back side 360 of the support structure. A fourth side 370 of the support structure 300 is framed by the two parallel side beams 312, 322 and is generally open in order to permit a balloon to be moved into and out of the support structure for inflating and launching.

The support structure may also include a one or more jib cranes for lifting and inflating of the balloons. In other words, the jib cranes operate to positioned the balloon and minimize movement prior to launch. In the example of FIG. 3, the support structure includes a first jib crane 382 and a second jib crane 384 mounted to a top surface of the lateral support beam 350. Each jib crane includes a cable 386, 388 that extends downward towards the interior space 302.

Figure 4:
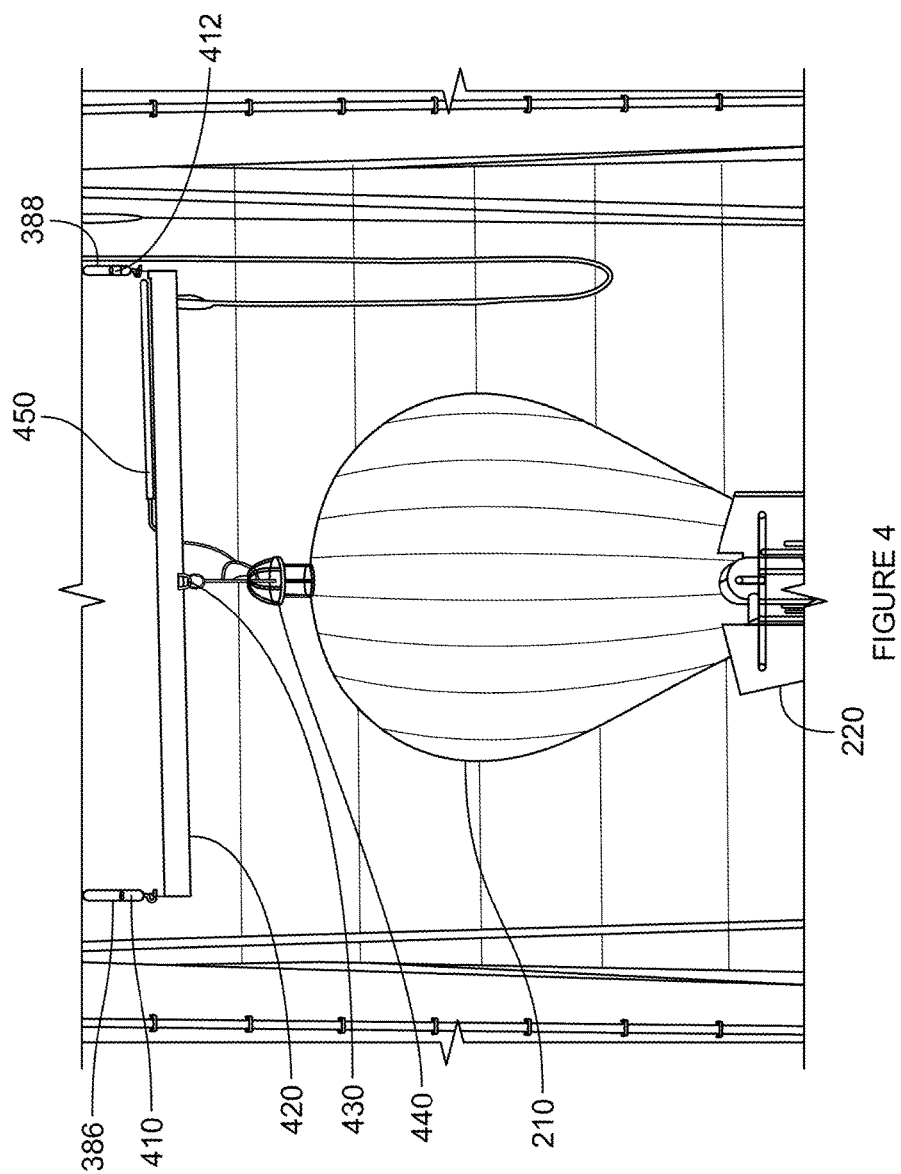
FIG. 4 is an example view of an interior space of the support structure in accordance with aspects of the disclosure.

As shown in FIG. 4, at the end of each jib crane cable is a connection 410, 412 for connecting to a beam or jib spreader 420. Each cable may be controlled by a corresponding hoist which may operate to extend and retract the cables 386, 388 of the first and second jib crane in order to lower and raise the jib spreader 420. In order to keep the jib spreader parallel with respect to the ground, the hoists may operate in unison or independently using a single controller.

Figure 5:
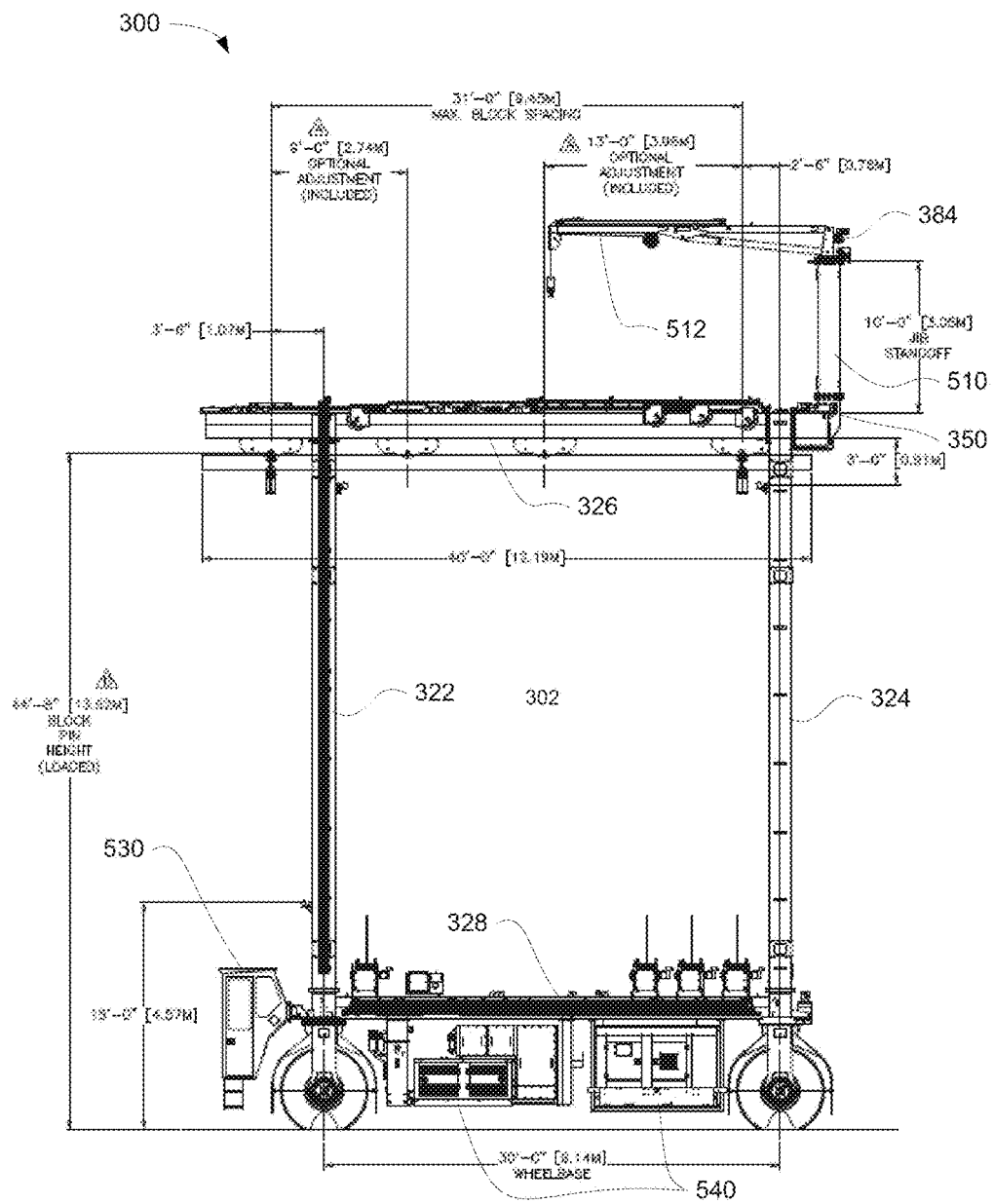
FIG. 5 is an example side view of the support structure in accordance with aspects of the disclosure.
Figure 6:
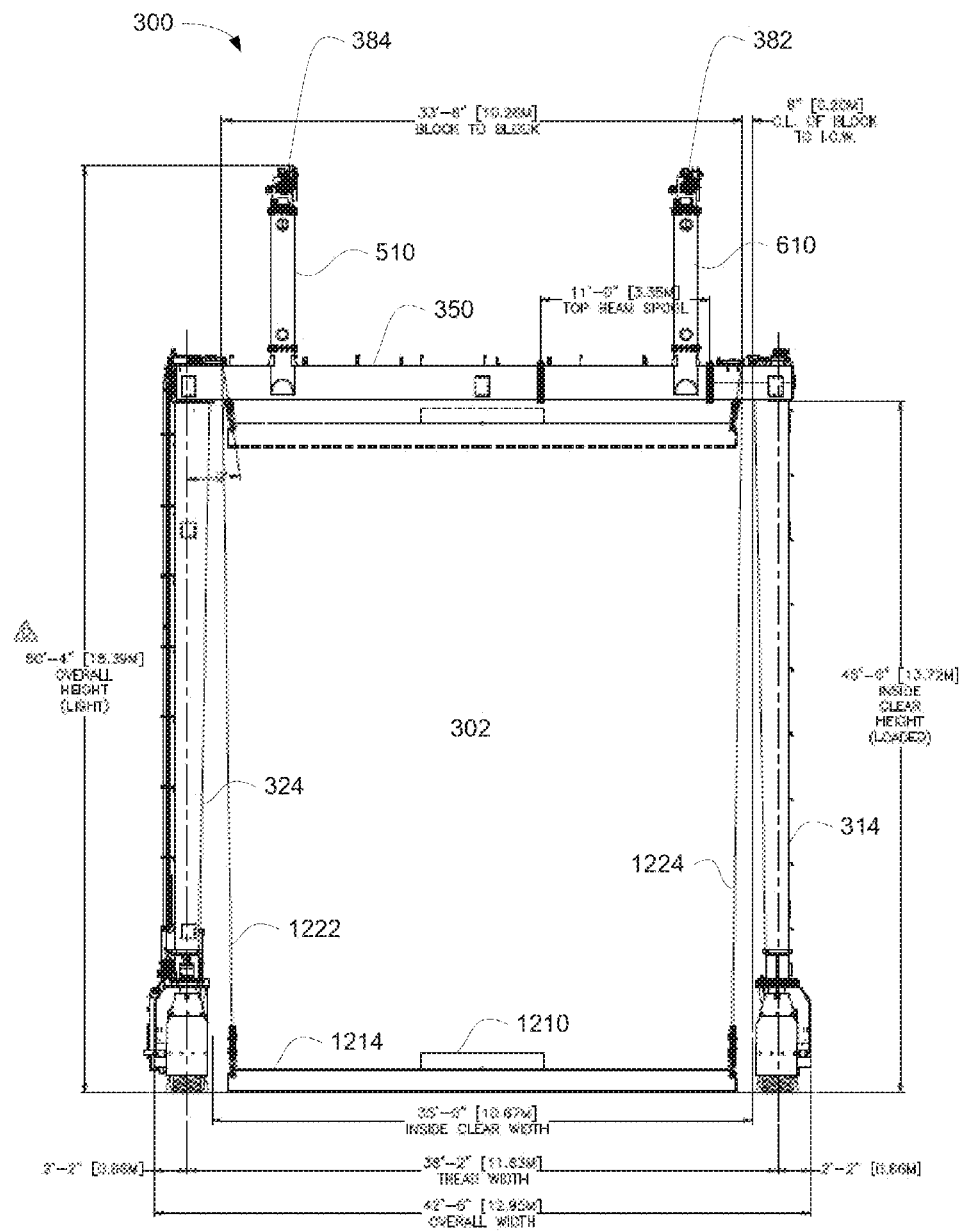
FIG. 6 is an example back view of the support structure and a platform in accordance with aspects of the disclosure.

FIG. 5 is a view of the right side 340 of the support structure 300 depicting only jib crane 384 (a view of the left side 330 of the support structure 300 would show jib crane 382). The jib cranes 382, 384 each include a first arm portion 510, 610 (shown in FIG. 6) and a second arm portion 512, 712 (shown in FIG. 7, a top-down view of the support structure 300). First arm portions 510, 610 are connected to the lateral support beam 350 and extend upwards from and generally perpendicularly to the lateral support beam. The second arm portions 512, 712 are connected to the first arm portion 510 and extend over the interior space 302.

In order to increase the range of movement of the jib spreader 420, the jib cranes may also be moveable in multiple degrees of freedom. For instance, each of the first arms 510, 610 of the jib cranes may be extended or retracted towards and away from the lateral support beam 350 (or rather, moved up and down), using a hydraulics system. In this regard the jib spreader 420 may move up and down and even above the parallel top beams 316, 326 of the support structure.

Figure 7:
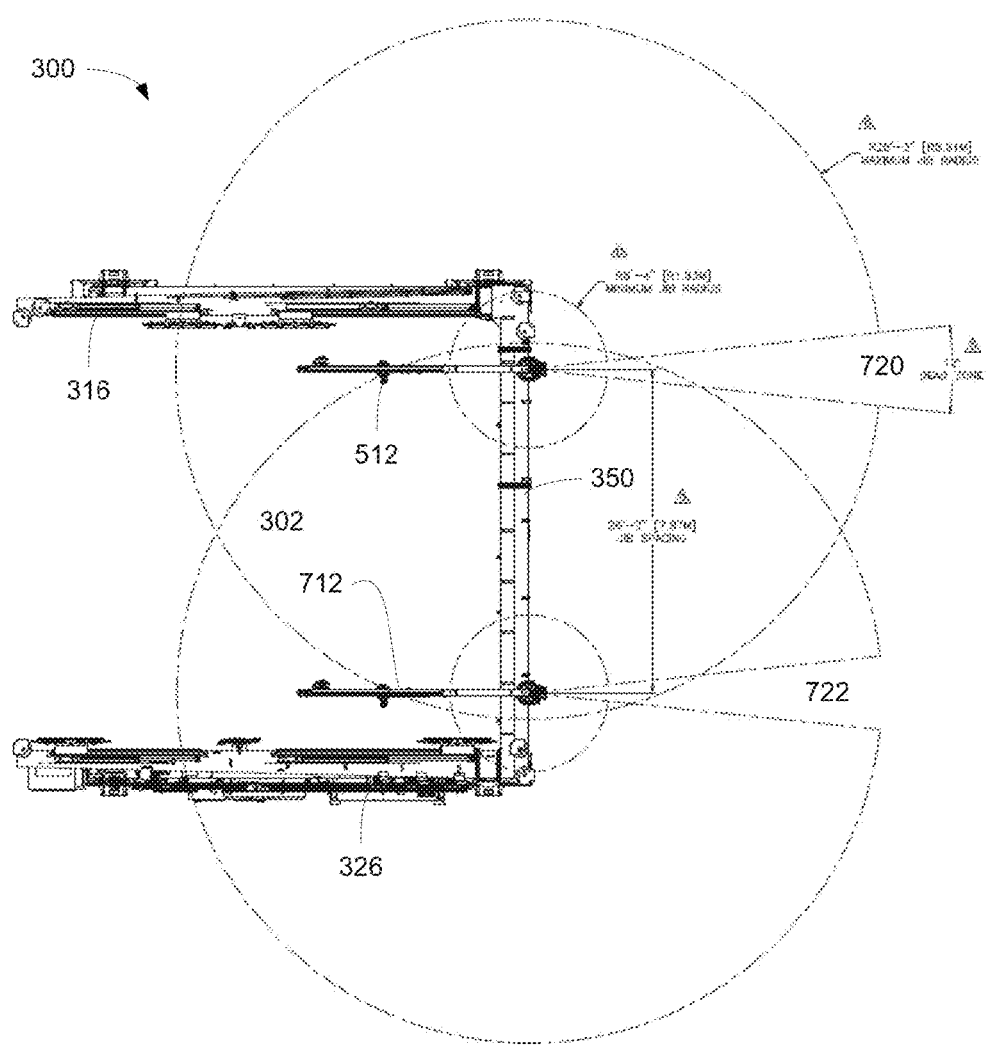
FIG. 7 is an example top-down view of the support structure in accordance with aspects of the disclosure.

The second arms may also be pivoted and rotated relative to the first arms. For example, the second arms 512, 712 may be able to pivot relative to the first arms 510, 610, respectively up to 89 degrees. As shown in FIG. 7, second arms 512, 712 can rotate relative to first arms 510, 610, respectively, approximately 348 degrees with only 12 degrees of "dead space" 720, 722, respectively.

In addition, as with the first arms, the second arms may also be extended and retracted. As an example, the second arms 512, 712 of the jib cranes may be approximately 5 feet 7 inches when fully retracted. The second arms may then be fully extended towards the fourth side 370 of the support structure 300 using a hydraulics system approximately 19 feet to 24 feet 5 inches.

Returning to FIG. 4, the jib spreader 420 includes a mount 430 for connecting an assembly 440 for lifting a balloon. The assembly 440 may also be configured to provide lift gas into the balloon envelope through an opening in the top plate of the balloon. In that regard, electrical and lift gas lines 450 may be connected to the assembly 440 from the jib spreader 410 as shown in FIG. 4.

Figure 8:
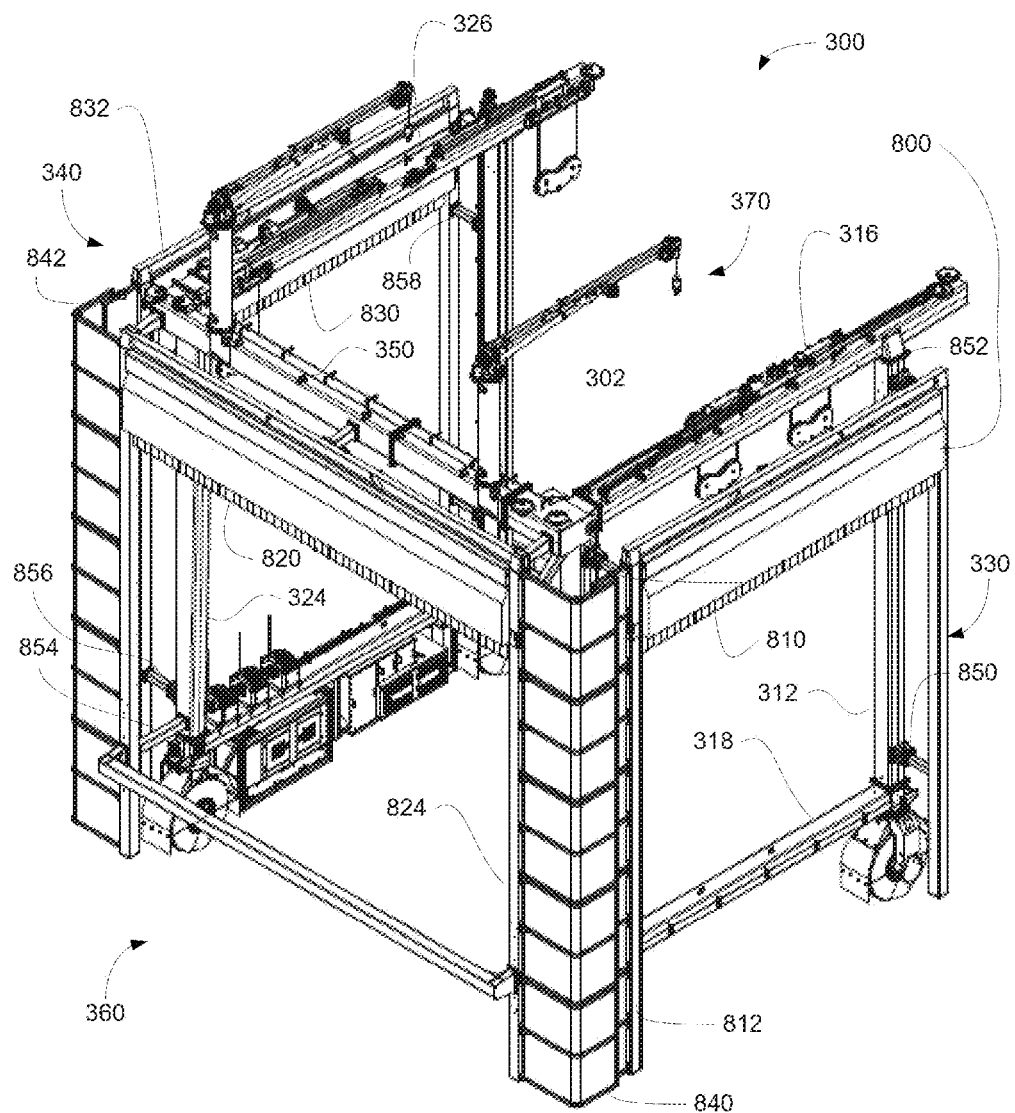
FIG. 8 is an example perspective view of a portable launch rig including the support structure and an attached door assembly in accordance with aspects of the disclosure.
Figure 9:
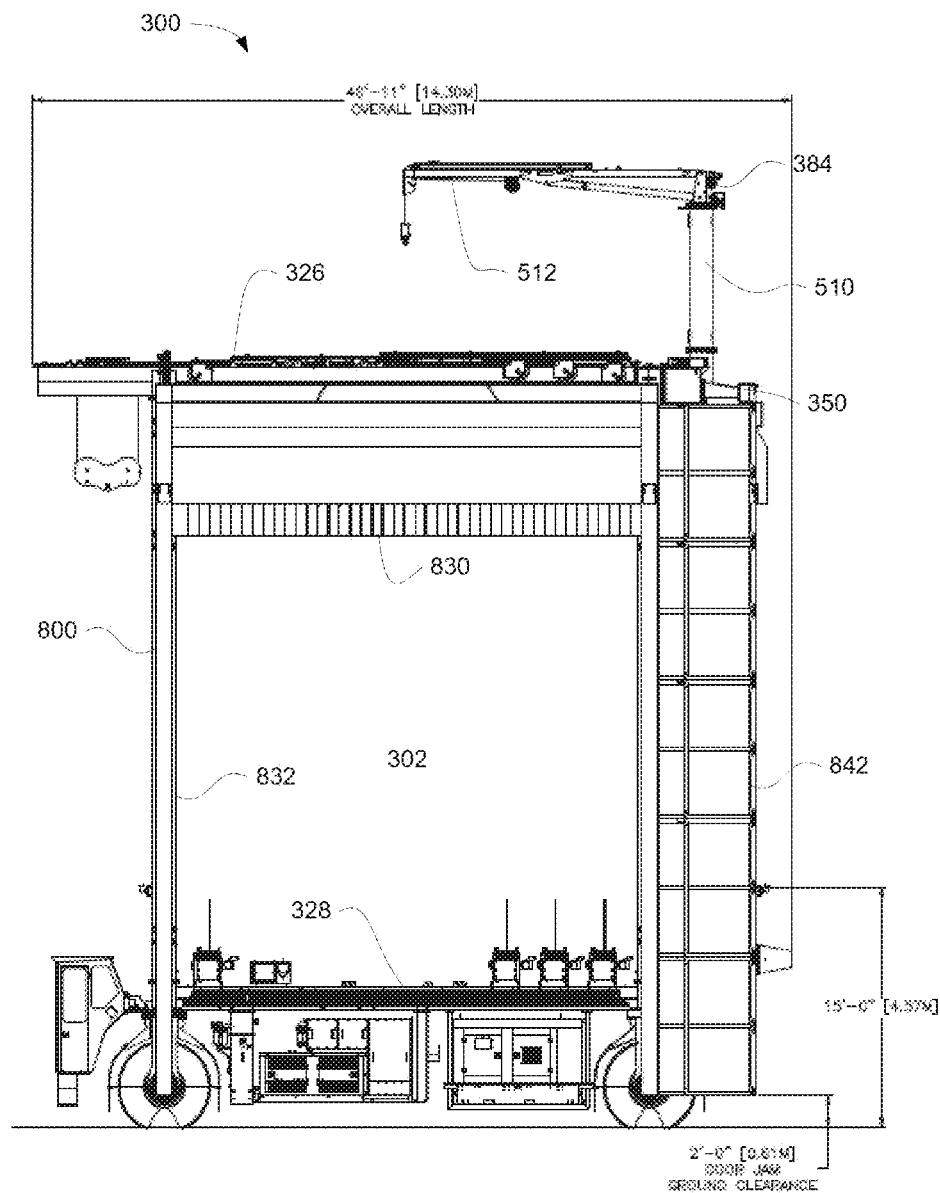
FIG. 9 is an example side view of the portable launch rig including the support structure and the attached door assembly in accordance with aspects of the disclosure.
Figure 10:
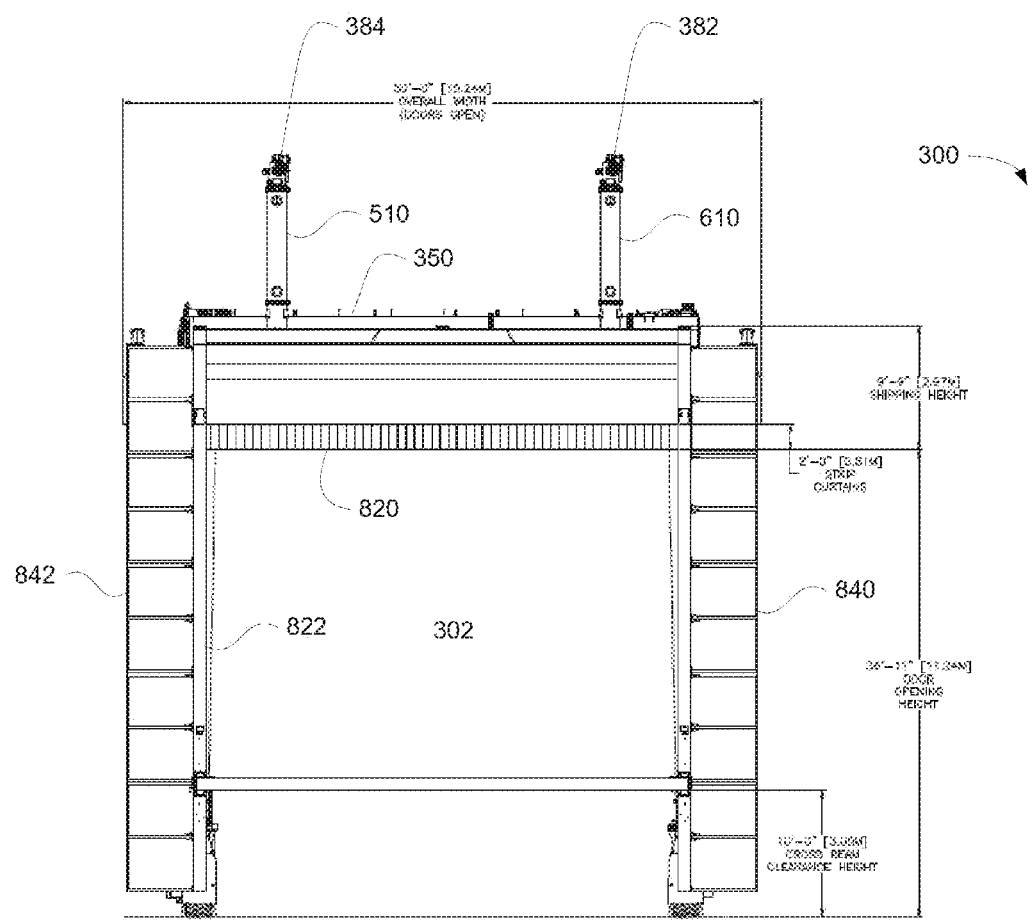
FIG. 10 is an example back view of the portable launch rig including the support structure and the attached door assembly in accordance with aspects of the disclosure.

In order to provide wind protection to the interior space 302, the support structure may include a three-sided door assembly. FIG. 8 is an example view of the support structure 300 (as shown in FIG. 3) with an attached door assembly 800. FIG. 9 is a side view (corresponding to FIG. 5) and FIG. 10 is a back view (corresponding to FIG. 6) of the support structure 300 with the attached door assembly 800. The door assembly includes retractable hangar doors 810, 820, and 830 set within corresponding rectangular hangar door frames 812, 814, 814.

Figure 11:
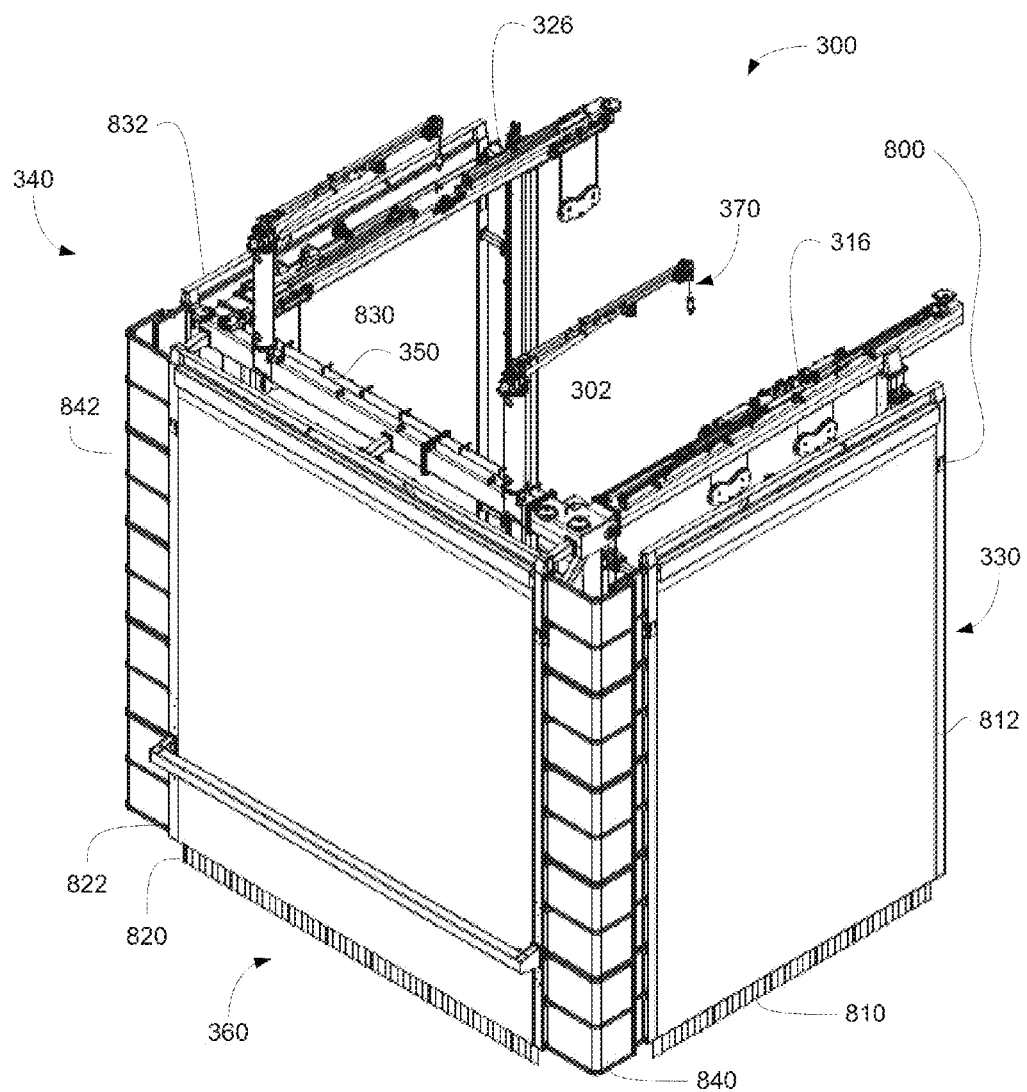
FIG. 11 is another example perspective view of the portable launch rig including the support structure and the attached door assembly in accordance with aspects of the disclosure.
Figure 12:
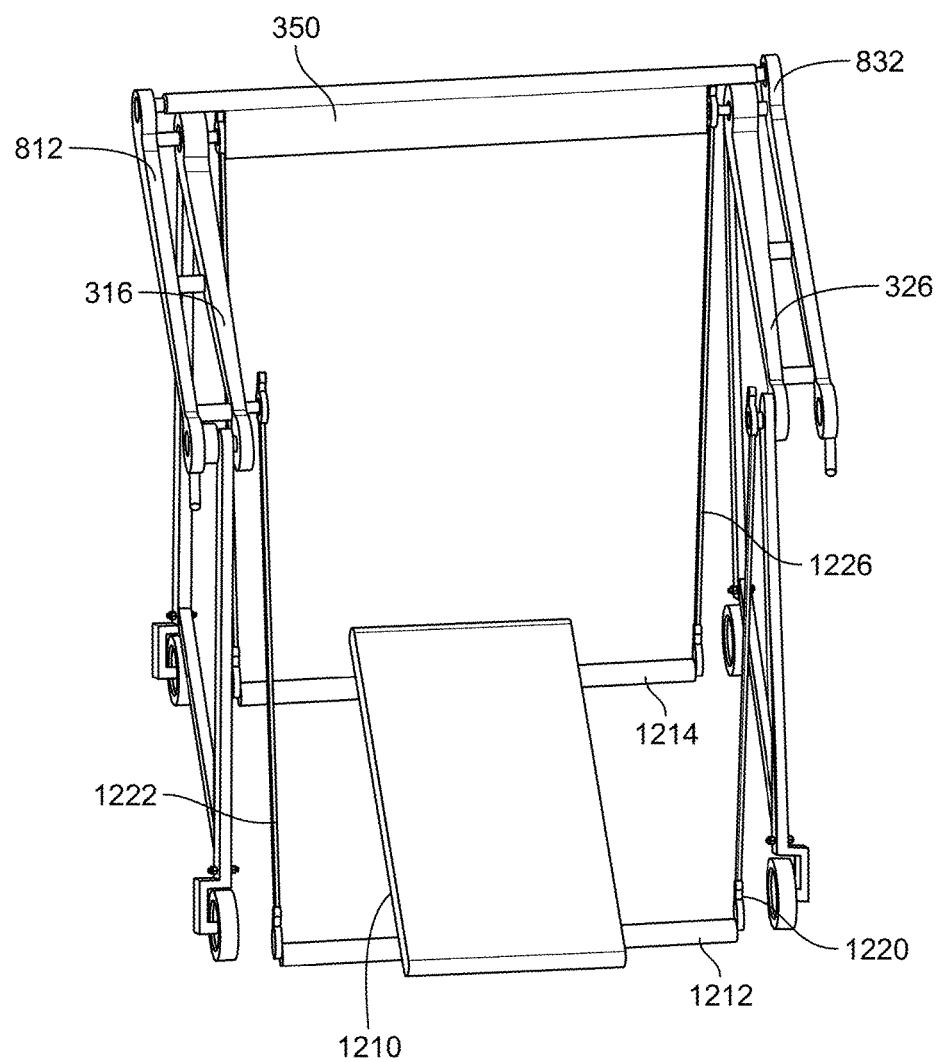
FIG. 12 is another example perspective view of the portable launch rig including the support structure, attached door assembly, and the platform in accordance with aspects of the disclosure.

FIGS. 8-10 depict the hangar doors partially open. In other words, not fully retracted or extended. When fully extended as shown in FIG. 11, these hangar doors are configured to block the wind from the interior space from the corresponding side of the support structure, while leaving a fourth side of the PLR open. In other words, each hangar door is configured to block wind from the direction of that door from entering into the interior space 302. For instance, door 810 blocks wind from the left side 330, door 820 blocks wind from the back side 360, and door 830 blocks wind from the right side 370 of the support structure. Side curtains 840, 842 between the hangar doors prevent wind from entering the interior opening 302 directly between the hangar door frames 812, 814, 814. When fully retracted as shown in FIG. 12, the doors may be rolled up completely or almost completely inside of three respective door housings arranged adjacent to the parallel top beams 316, 326 and lateral support beam 350. These rolling doors allow the PLR's support structure 300 to withstand higher wind conditions without imposing higher wind loads on the structure.

Returning to FIG. 8, the door assembly 800 is attached to the support structure 300 via a plurality of structural spacing bars 850, 852, 854, 856, 858. These spacing bars rigidly connect the hangar door frames 812, 814, 814 to the support structure and hold the hangar door frames a short distance away from the support structure, for example, approximately 2 feet. By doing so, this allows the wheels of the support structure (discussed in further detail below) to be out of alignment, for instance, up to 2 degrees when the PLR is moving over uneven surfaces without affecting the use of and reducing the stresses on the hangar doors when the wheels are out of alignment.

Returning to FIG. 12, in order to lift, fill and launch the balloons, a platform 1210 may be arranged within the interior space. The platform 1210 includes two lateral support bars 1212, 1214 which are each connected by two cables 1220, 1222 and 1224 (shown in FIG. 6), 1226, respectively to a corresponding one of the parallel top beams 316, 326 of the support structure 300. Each cable 1220, 1222, 1224, 1226 may be controlled by a corresponding hoist which may operate to extend and retract the corresponding cable in order to lower and raise lateral support bars 1212, 1214 towards and away from the parallel top beams 316, 326, thereby raising and lowering the platform. In order to keep the platform 1210 parallel with respect to the ground, the hoists may operate in unison or independently. The hoists used to raise and lower the platform may also be controlled with the single controller. In this regard, the cables can be used to raise and lower the platform completely independent of the cables of the jib cranes and/or in unison with the hoists of the jib cranes. In that regard, the movement of the jib cranes may be independent of or synchronized with the movement of the platform.

As shown in FIG. 13, the platform 1210 may be or may include a movable perch 1310. The perch 1310 can pivot relative to the platform 1210 in the direction of arrows 1312, using a hydraulics system, in order to lift the balloon during inflation as well as to move and lift the balloon during launch. A first end 1320 of the perch includes a releasable restraint 1330 for holding a portion of the balloon envelope to the perch during inflation and prior to launch. The releasable restraint includes a roller bar 1340 which allows material of the balloon envelope to slide within the releasable restraint 1330 without pulling on or damaging the material. In addition, the releasable restraint may 1330 be configured to move along the perch 1310 in order to assist an operator in positioning the balloon envelope on the perch.

The second end 1322 of the perch 1310 may be configured for attachment with the payload of a balloon. For example, the second end may include or be attached to a payload positioning assembly 1710 (shown in FIG. 17) including two arms 1720, 1730 having end portions 1722, 1732 which are configured to clamp onto a portion of the balloon as well as a rest structure 1740 for holding the payload prior to launch. The payload positioning assembly may position or maintain the position of the payload until the releasable restraint has been released and the balloon envelope has reached a certain height or location relative to the payload where the payload is ready to be released. This reduces the likelihood that the payload will collide with the perch, platform, or ground after the payload is released during a launch.

In another example, the second end 1322 of the perch 1310 and/or the platform 1210 may include a connection member for connecting with a cart that includes the payload positioning assembly. As shown in FIG. 14A, one end 1412 of a cart 1410 may include a rest structure 1420 for holding the balloon's payload to the perch during inflation and prior to launch. As shown in FIG. 14B, the cart is sized to hold a box 1450 including a balloon (corresponding to box 1750 shown in FIG. 17). In this regard, the box 1450 may be placed on the cart at one location such as a warehouse, storage location, etc.), and the cart may be used to move the box towards the support structure. Once in position, the cart may be connected to the perch 1320 as shown in FIG. 13.

A second end 1414 of the cart 1410 may include a payload positioning assembly 1430 including two arms 1440, 1444 having end portions 1442, 1446 which are configured to clamp onto a portion of the balloon. As with payload positioning assembly 1710, payload positioning assembly 1430 may position or maintain the position of the payload until the releasable restraint has been released and the balloon envelope has reached a certain height or location relative to the payload where the payload is ready to be released. This reduces the likelihood that the payload will collide with the perch, platform, or ground after the payload is released during a launch.

In some examples, the second end 1322 of the perch 1320 may be or include a tail portion that further reduces the likelihood of the payload swing back towards the perch and colliding with launch equipment and causing damage to the payload component as well as the launch equipment. The tail portion may hang off of the end of the perch and tilt towards the back side of the support structure 300, for example, as shown in FIG. 13. By doing so, the payload 220 is moved even closer to the perch, increasing the likelihood that the payload will move away from the support structure when it is released during launch rather than swinging back towards the support structure.

Figure 15A:
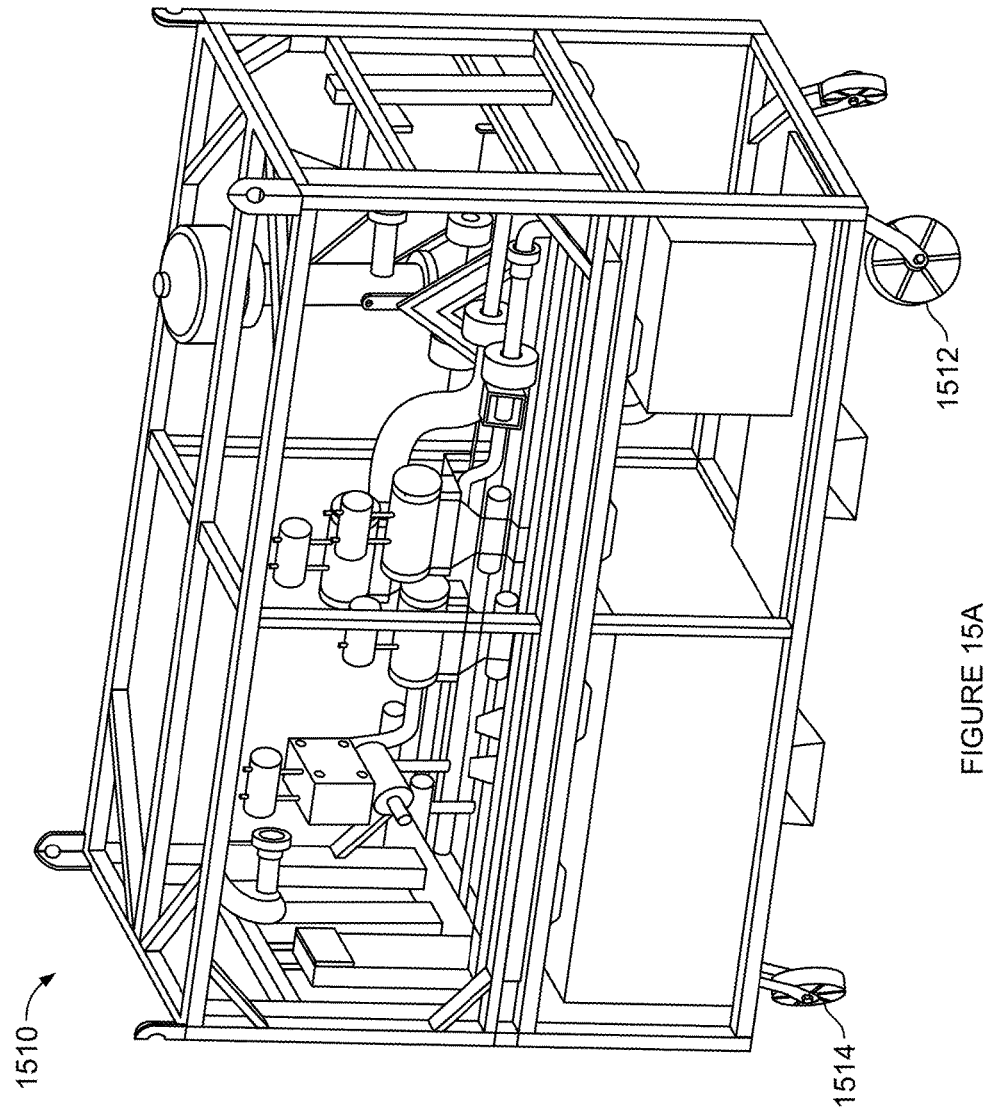
FIGS. 15A and 15B are example lift gas supply carts in accordance with aspects of the disclosure.
Figure 15B:
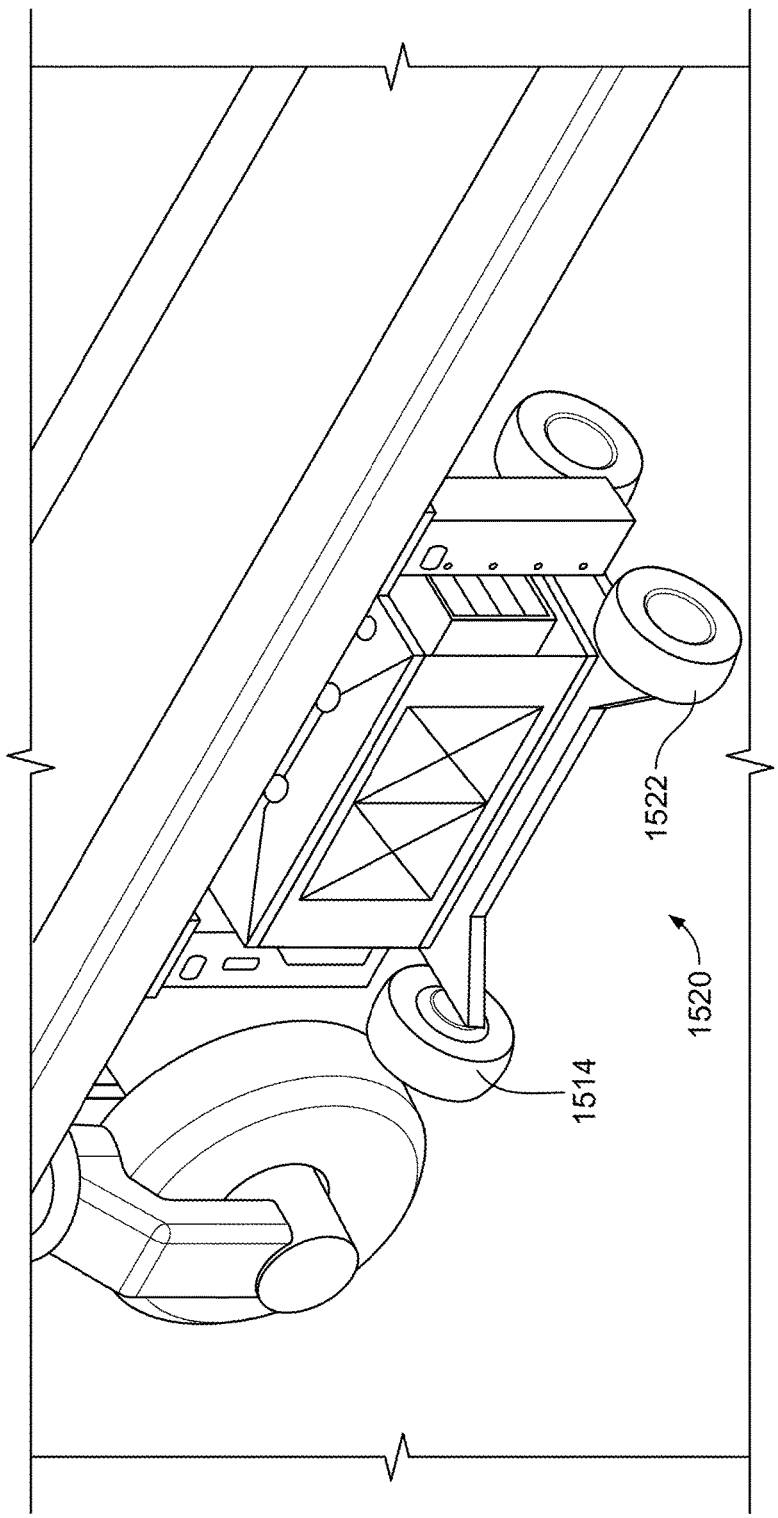

As noted above, the PLR may be used not only to launch a balloon, but also the fill the balloon. In this regard, a lift gas supply may be provided. The lift gas supply may be integrated into the support structure 300, in order to reduce the likelihood of kinking of the lift gas supply line when the support structure is moved. Alternatively, the lift gas supply may be an independent assembly, such as one of the lift gas supply carts 1510, 1520 shown in FIGS. 15A and 15B. Again, in order to reduce kinking of the lift gas supply line when the support structure is moved, the lift gas supply cart may be configured to connect and move with the support structure. When connected, the lift gas supply cart may include a gas supply that can connect with the lift gas line 440 in order to fill a balloon envelope with lift gas. Because the supply carts 1510, 1520 include wheels 1512, 1514 and 1522, 1524, respectively, when needed, one of these lift gas supply carts may be wheeled over to the support structure and connected to the lift gas line 450.

The lift gas supply cart may include a supply of lift gases, such as hydrogen and/or helium, as well as various metering devices which provide for highly accurate metering of the amount of lift gas in the balloon envelope during inflation. The lift gas supply cart may also be configured to provide lift gas to the balloon envelope at very high rates of speed and a range of temperatures, such as between −20 degrees C. to 50 degrees C.

Figure 16C:
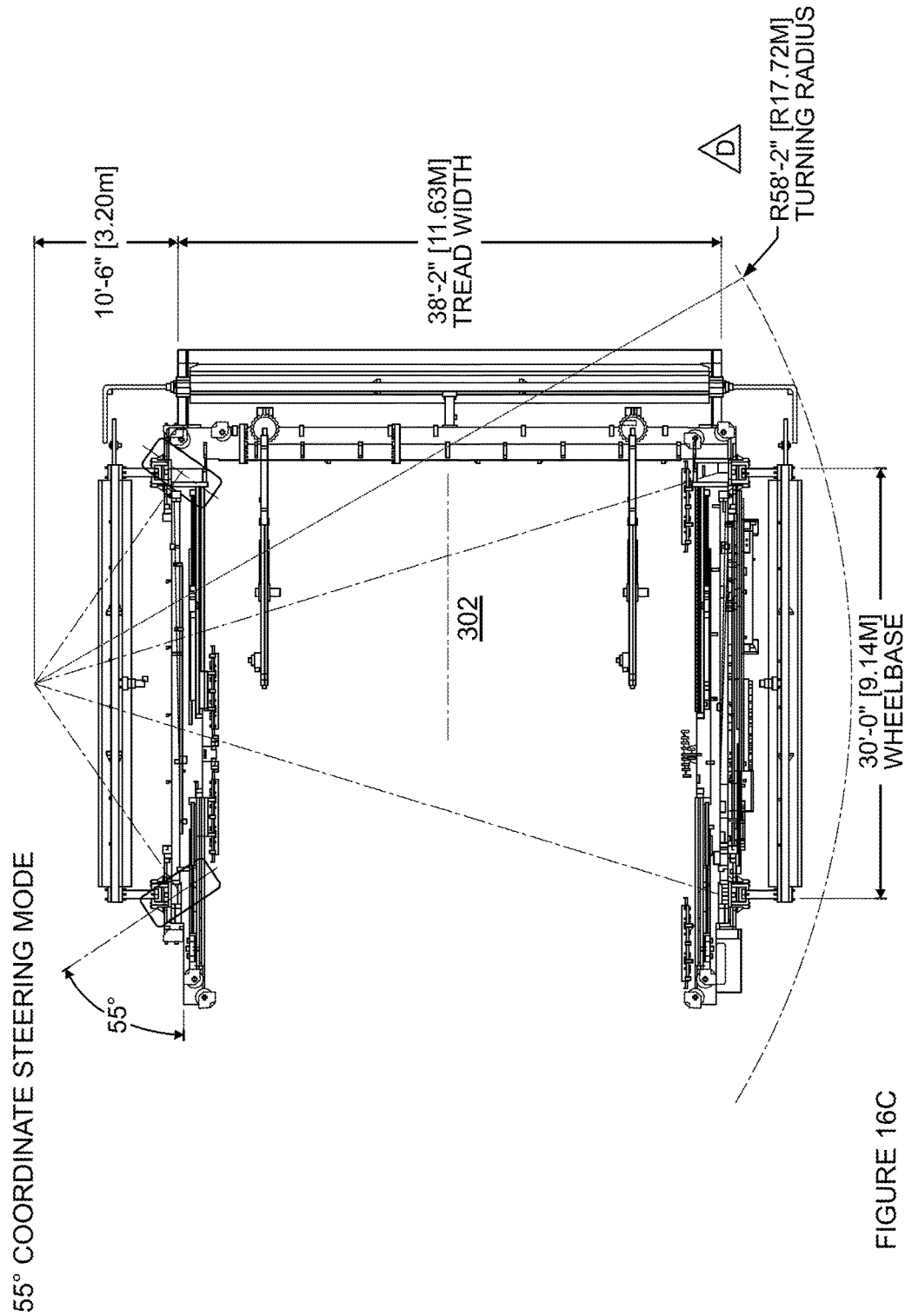

The PLR is also configured to change the position and orientation of the support structure. For instance, returning to FIG. 3, each of the bottom beams 318, 328 may include two or more wheels 390, 392 and 394, 396, respectively. Each wheel may include an independent hydraulics or gear drive system to turn (angle) and rotate (drive) that wheel. The independent movement of each wheel allows the PLR to have many different types of movement such as 2-wheel and 4-wheel drive modes. FIGS. 16A-E are top down views of the PLR demonstrating various steering modes. For instance, FIG. 16A depicts a 90 degree two-wheel steering mode where wheels 392 and 394 are fixed at an orientation perpendicular to the bottom beams 318 and 328 (wheels 390 and 396 can rotate relative to the bottom beams in order to steer the PLR). FIG. 16B depicts 90 degree two-wheel steering mode where wheels 390 and 396 are fixed at an orientation perpendicular to the bottom beams 318 and 328 (wheels 392 and 394 can rotate relative to the bottom beams in order to steer the PLR). FIG. 16C depicts a 55 degree coordinate steering mode where the wheels pivot relative to the bottom beams 318 and 328 up to 55 degrees, FIG. 16D depicts a crab steering mode where the wheels pivot relative to the bottom beams 318 and 328 up to 110 degrees, and FIG. 16E depicts a carousel steering mode where the wheels can be oriented at a specific angle relative to the bottom beams 318 and 328 in order to carousel the PLR around a point P within the interior space 302. By changing the orientation of the wheels, the PLR can always be maneuvered such that the fourth open side of the PLR can be rotated to downwind as wind conditions at a launch site change.

The various features of the PLR may be electrically connected to a control system. Returning to FIG. 5, various user inputs (such as the single controller noted above), may be included within a cab 530 sized to accommodate an operator. These user inputs may allow the operator to communication with the control system 540 in order to control the movement and position of the wheels 390, 392, 394, 396, platform 1210, perch 1310, releasable restraint 1330, payload positioning assembly 1210 (or the features of cart 1410), jib cranes 382 and 284, the hangar doors 810, 820, and 830, as well as various other features of the PLR.

The operator need not rely only on visible observation of the state of the PLR and wind conditions; rather, the PLR may include a data acquisition system. The data acquisition system may include various sensors arranged to detect the position and location of the wheels 390, 392, 394, 396, platform 1210, perch 1310, releasable restraint 1330, payload positioning assembly 1210 (or the features of cart 1410), jib cranes 382 and 284, the hangar doors 810, 820, and 830, as well as various other features of the PLR. The PLR may also include a plurality of sensors configured to detect and provide information regarding current wind conditions outside of the PLR and also within the interior space 302. In addition, the control system may also communicate with the lift gas supply cart 1510, 1520 to control the inflating of a balloon envelope. These sensors may send information to the control system which processes the information and provides it for display, for example, on an electronic display (not shown) within the cab 530, to the operator.

In this regard, the control system 540 may include one or more processors, memory, as well as other components typically present in general purpose computing devices. For instance, the memory stores information accessible by the one or more processors, including instructions and data that may be executed or otherwise used by the processor 120. The memory may be of any type capable of storing information accessible by the processor, including a non-transitory computer-readable medium or other medium that stores data that may be read with the aid of an electronic device, such as a hard-drive, memory card, ROM, RAM, DVD or other optical disks, as well as other write-capable and read-only memories. The instructions may be any set of instructions to be executed directly (such as machine code) or indirectly (such as scripts) by the processor. For example, the instructions may be stored as computing device code on the computer-readable medium. The instructions may be stored in object code format for direct processing by the processor, or in any other computing device language including scripts or collections of independent source code modules that are interpreted on demand or compiled in advance. The data may be retrieved, stored or modified by processor 120 in accordance with the instructions. The one or more processor may be any conventional processors, such as commercially available CPUs. Alternatively, the one or more processors may be a dedicated device such as an ASIC or other hardware-based processor. The processor, computing device, or memory may actually include multiple processors, computing devices, or memories that may or may not be stored within the same physical housing.

In addition, the control system 540 may be configured to send information to a remote computer via a communication link so that an operator outside of the cab 530 may still be able to control the movement and position of the wheels 390, 392, 394, 396, platform 1210, perch 1310, releasable restraint 1330, payload positioning assembly 1210 (or the features of cart 1410), jib cranes 382 and 284, the hangar doors 810, 820, and 830, as well as various other features of the PLR. For example, this communication link can be a wired or wireless link that uses several kinds wireless communication protocols, such as WiFi, Bluetooth or other protocols. As with control system 540, the remote computer may include a processor and memory storing data and instructions as discussed above.

In yet another example, the control system 540 may operate autonomously. That is, rather than having an operator control the various aspects of a balloon launch (as discussed in further detail below), the control system may use the data from the various sensors to automatically control the movement and position of the wheels 390, 392, 394, 396, platform 1210, perch 1310, releasable restraint 1330, payload positioning assembly 1210 (or the features of cart 1410), jib cranes 382 and 284, the hangar doors 810, 820, and 830, as well as various other features of the PLR according to its instructions. For example, rather than having an operator adjust the position (height) of the platform 1210 as the wind speed increases or decreases, the control system may adjust its position automatically according to the instructions of the control system's memory. Of course, for safety reasons, the control system may be controlled in a manual mode by an operator either within the cab or remotely at any time.

Example Balloon Positioning, Inflating and Launching

Figure 17:
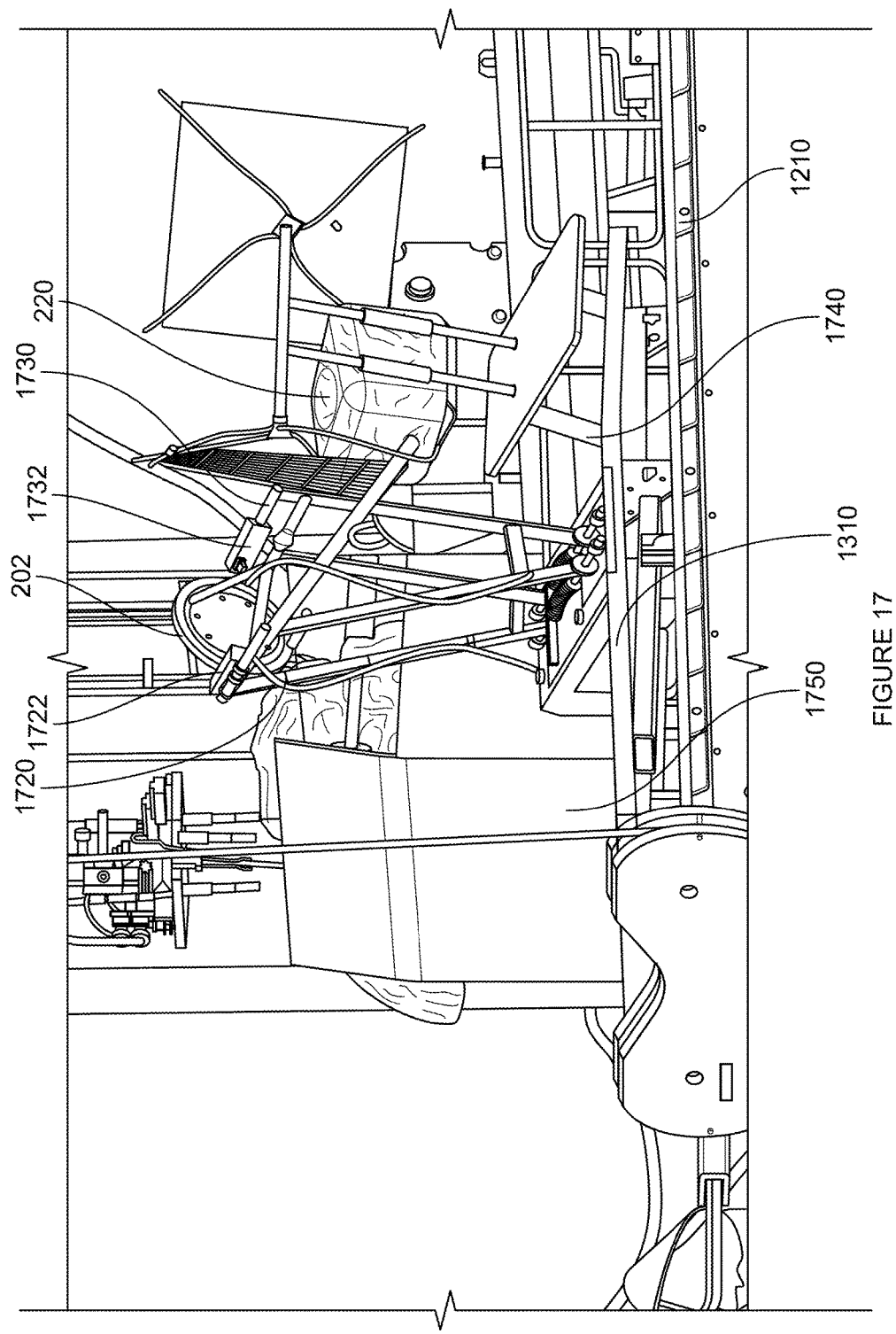
FIG. 17 is an example of portions of the portable launch rig and positioning of the balloon prior to inflating and launching in accordance with aspects of the disclosure.

As noted above, the PLR may be used to lift, fill and launch a balloon. In order to do so, at least a portion of the balloon may be positioned within the interior space 302. As shown in FIG. 17, the box 1750 containing a balloon 200 may be placed on the perch 1310 within the interior space 302. The payload 220 may be placed on the rest and the end portions 1722, 1732 of arms 1720, 1730 may be clamped onto the base plate 202. In addition, the roller bar 1340 of the releasable restraint 1330 may be clamped onto the balloon envelope 210 and slid towards the first end 1322 of the perch 310 and into the interior space 302.

In order to lift the balloon 200 out of the box 1750, the jib spreader may be positioned over and lowered towards the box. As indicated above, this may be achieved by positioning the first and second arms of the jib cranes and extending the cables 386 and 388. The assembly 440 for lifting the balloon may then be secured to the top plate 201. The hoists of the jib cranes of may then retract the cables 386, 388 in order to raise the jib spreader 420 and pull the balloon envelope out of the box 1750 (see FIG. 4).

Figure 18:
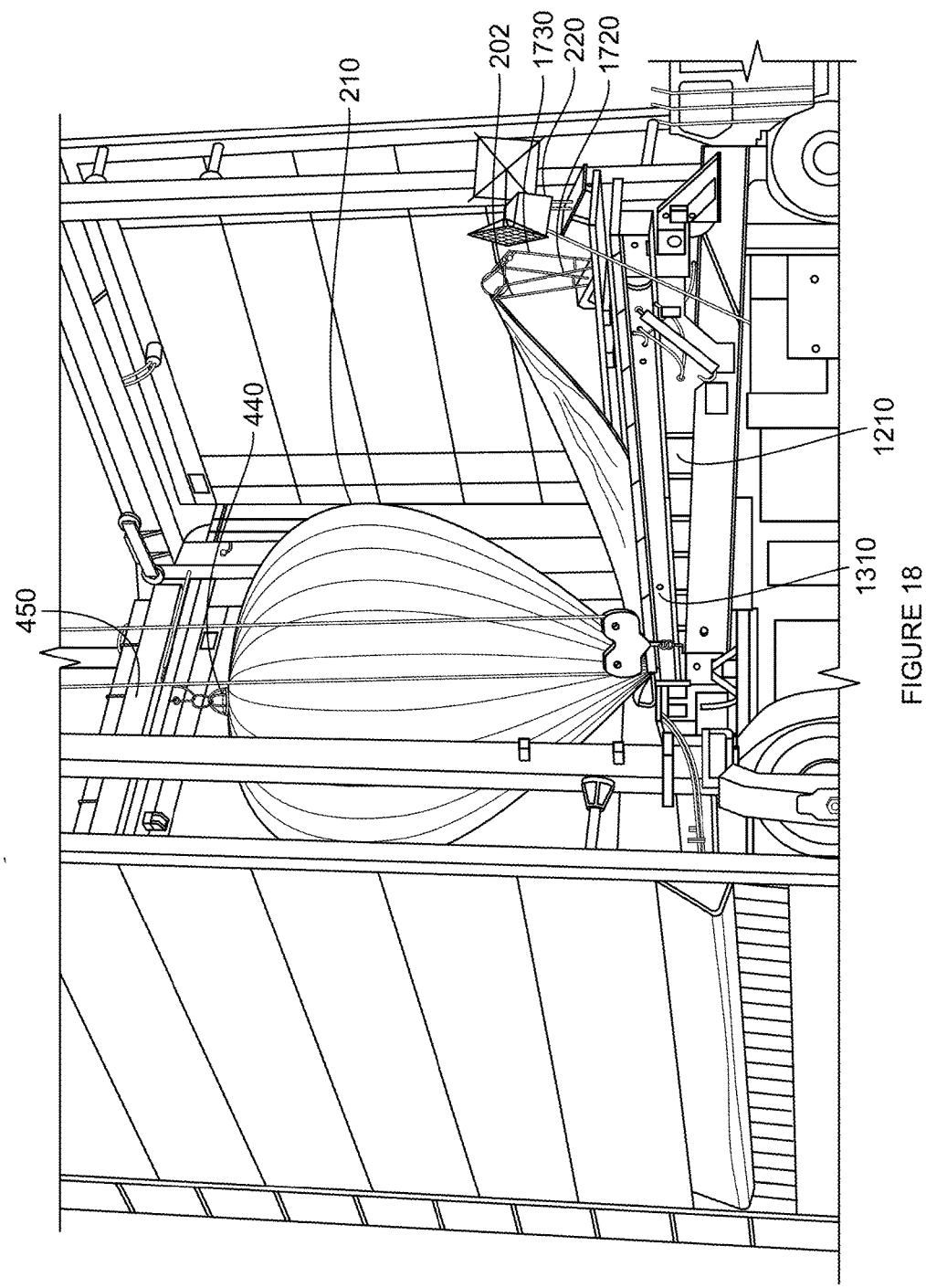
FIG. 18 is an example of portions of the portable launch rig and inflating of the balloon with lift gas in accordance with aspects of the disclosure.

Prior to or once the assembly 440 is secured to the top plate 201, one of the lift gas supply carts 1510 or 1520 may be wheeled over to the support structure and connected to the lift gas line 450. As shown in FIG. 18, lift gas from the supply cart may then flow into the balloon envelope 210 via the lift gas line and assembly 440 until the filling is complete or the desired inflation pressure is reached within the balloon envelope.

Prior to, during and after the inflation, the features of the PLR may be moved in order to obtain the best possible launch conditions within the interior space as wind conditions around the PLR change. For example, the hangar doors 810, 820, 830 may be lowered to reduce the wind within the interior space from the direction of the left side 330, back side 360, and right side 340 of the support structure. Even in situations where the direction of the wind changes, the drive and steering examples above may be used to change the position of the PLR so that the front side 370 is downwind. This can even further reduce the amount of wind within the interior space.

In addition, the platform and/or jib spreader may be raised or lowered in order to raise or lower the position of the top plate (and balloon envelope) and the angle of the perch changed in order to best position the balloon envelope for the current wind conditions at launch. For instance, in greater wind conditions, the platform may be raised higher and angle of the perch 1310 relative to the platform 1210 may be decreased (less than 90 degrees). After the balloon is launched, this configuration may reduce the likelihood of the payload 220 acting like a pendulum and striking the platform 1210, perch 1310, or PLR as the balloon envelope moves in the opposite direction. In lesser wind conditions, the platform may be lowered and the angle of the perch relative to the platform may be increased (closer to or even greater than 90 degrees) as it is less likely that there will be such a pendulum effect and the balloon is likely to move more gradually away from the PLR.

Once the inflating is complete and the PLR (and platform 1210, etc.) are positioned for the current wind conditions where the fourth side 370 is positioned downwind, the balloon 200 may be ready for launch. At this point, the top plate 201 may be released from the assembly 440. At the same time or shortly thereafter, the assembly may be pulled away from the top plate 201 (via the jib cranes 382, 384). This may reduce the likelihood of damage to the balloon envelope from hitting the assembly 440 or jib spreader 420 during launch.

Figure 19:
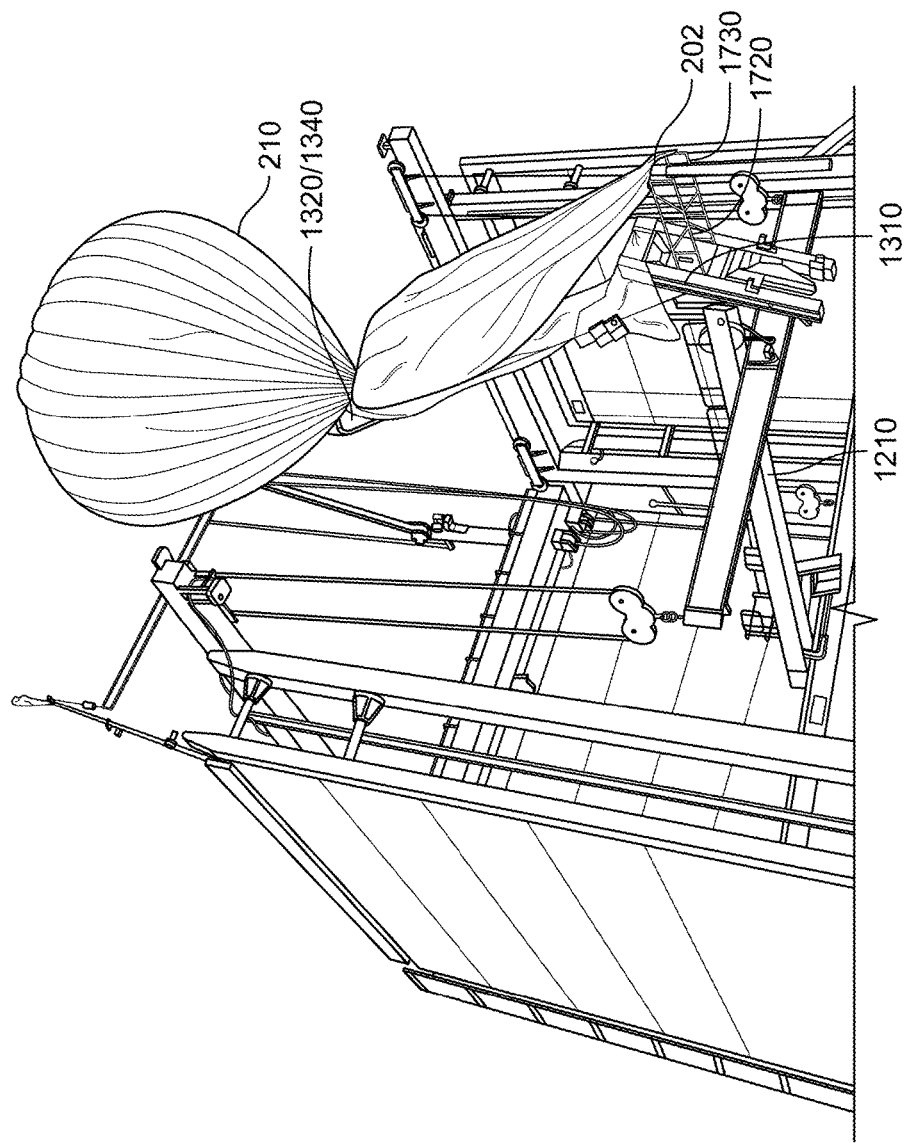
FIGS. 19-20 are examples of portions of the portable launch rig and the balloon during launch in accordance with aspects of the disclosure.
Figure 20:
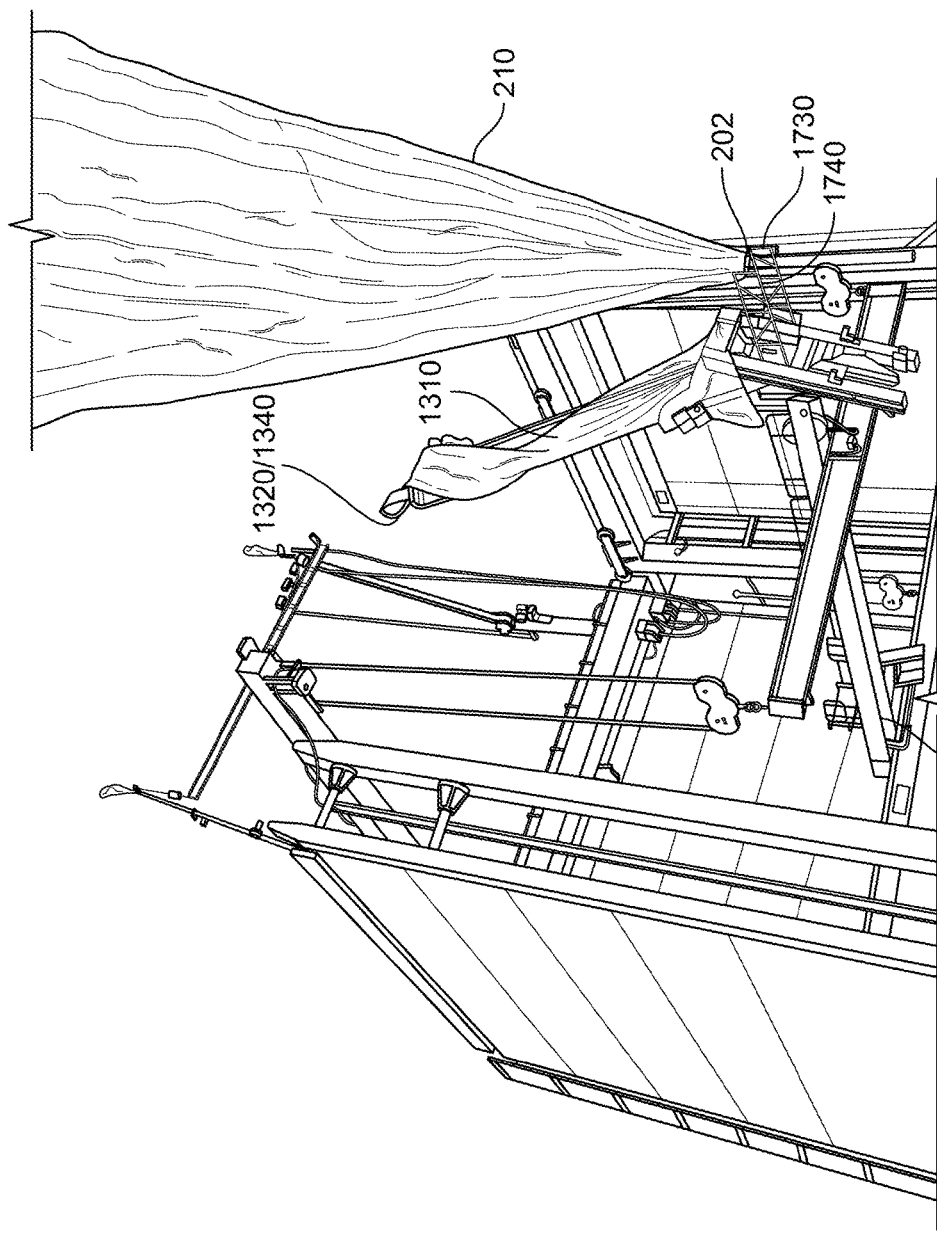

At launch, the first end 1320 of the perch 1310 is swung upwards as shown in FIG. 19. Next, the balloon envelope 210 is released from the releasable restraint 1340 by swinging the roller bar 1340 away from the releasable restraint. This causes the balloon envelope 210 to begin to rise away from the first end 1320 of the perch 1310 as shown in FIG. 20.

Figure 21:
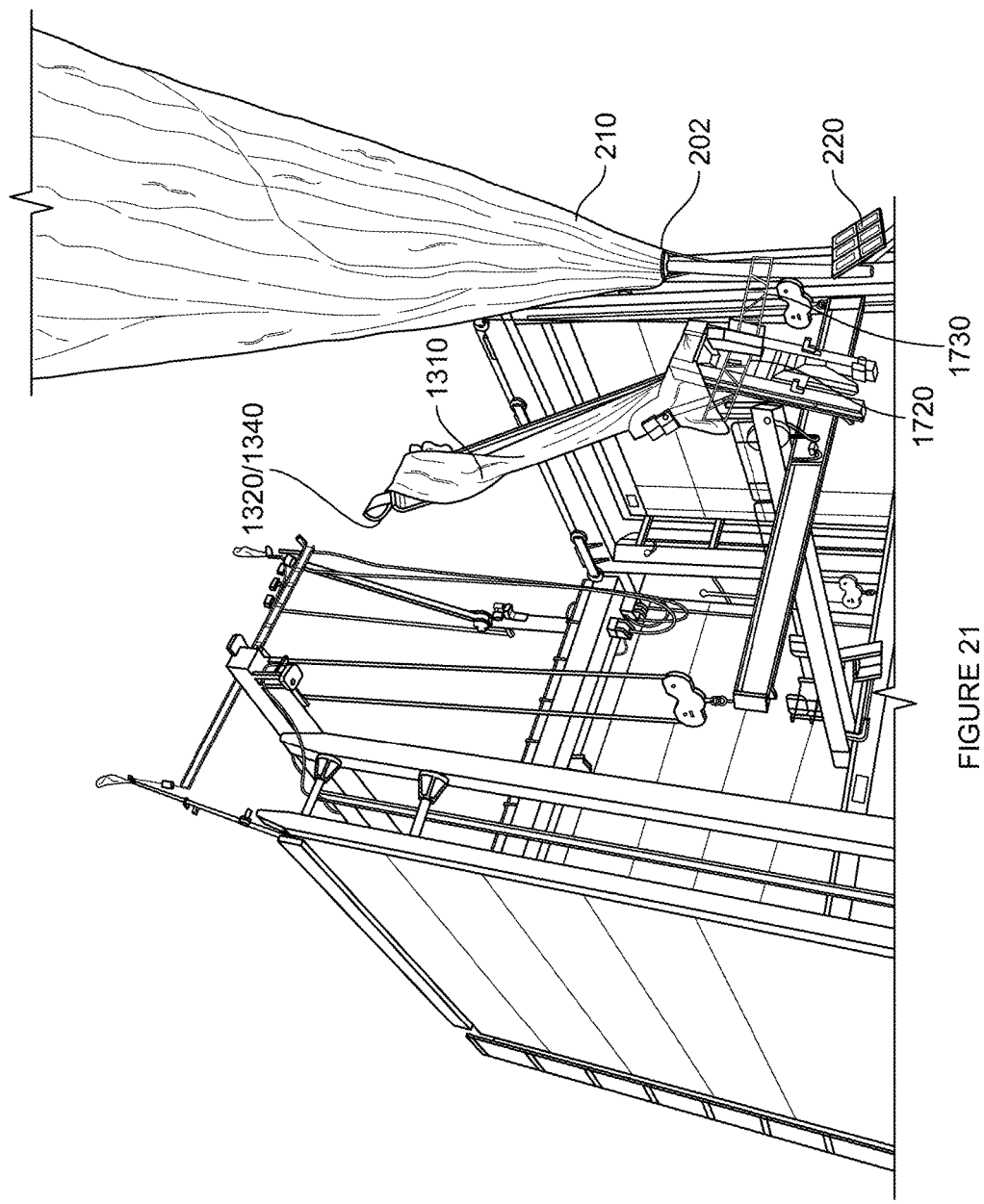
FIG. 21 is an example of portions of the portable launch rig and a fully launched balloon in accordance with aspects of the disclosure.

At an appropriate time thereafter, such as when the balloon envelope has passed over (or beyond) the payload 220, the end portions 1722, 1732 of arms 1720, 1730 may be released from the base plate 202. As shown in FIG. 21, the arms 1720, 1730 may swing away from the base plate 202, allowing the balloon (including the payload) float away and completing the launch.

The features described herein allow for a controlling the launch of expensive, high-altitude balloons in various and variable wind conditions. In addition to the features and benefits discussed above, by using hydraulics and electrical systems in view of diesel or gasoline motors as well as turning off systems not necessary for launch, the PLR can be safe to use with flammable lift gasses such as hydrogen. Moreover, the structure of the PLR allows for it to be broken down and arranged into a standard shipping container for transport to different launch locations. In addition, by automating the entire lifting, inflating, and launch of a balloon reduces the number of operators required onsite which, in turn, may improve both the safety and speed of these processes.

Figure 22:
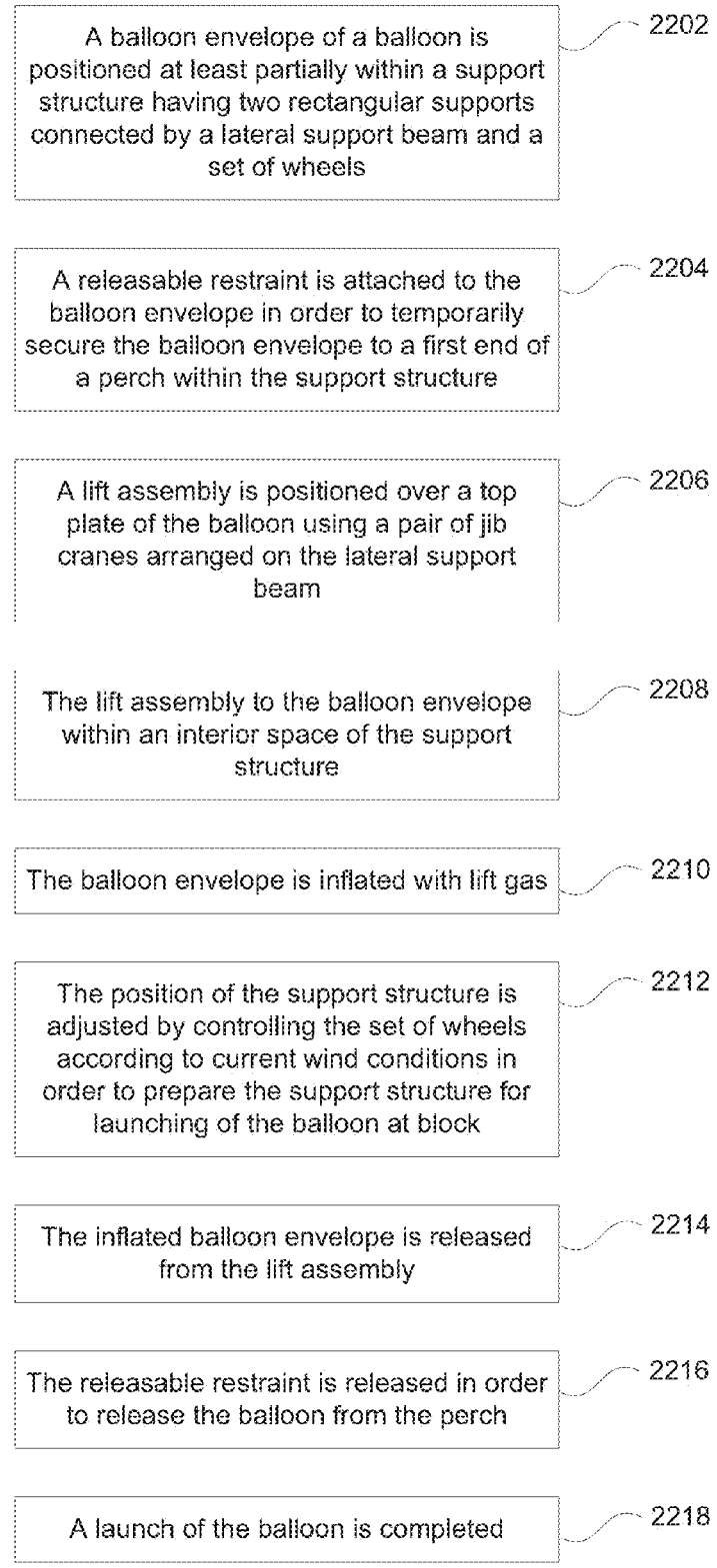
FIG. 22 is an example flow diagram in accordance with aspects of the disclosure.

FIG. 22 is a flow diagram 2200 in accordance with some of the aspects described above. For example, a balloon envelope of a balloon is positioned at least partially within a support structure having two rectangular supports connected by a lateral support beam and a set of wheels at block 2202. A releasable restraint is attached to the balloon envelope in order to temporarily secure the balloon envelope to a first end of a perch within the support structure at block 2204. A lift assembly is positioned over a top plate of the balloon using a pair of jib cranes arranged on the lateral support beam at block 2206. The lift assembly to the balloon envelope within an interior space of the support structure at block 2208. The balloon envelope is inflated with lift gas 2210. The position of the support structure is adjusted by controlling the set of wheels according to current wind conditions in order to prepare the support structure for launching of the balloon at block 2212. The inflated balloon envelope is released from the lift assembly at block 2214. The releasable restraint is released in order to release the balloon from the perch at block 2216. And thereafter, a launch of the balloon is completed at block 2218.

Aspects, features and advantages of the disclosure will be appreciated when considered with reference to the foregoing description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments.

The invention claimed is:

1. A system for lifting, inflating, and launching a balloon including a balloon envelope, the system comprising:
   a support structure including two side supports defining an interior space for lifting and filling a balloon envelope, each side support including two side beams connected by top support beams and bottom support beams, wherein the bottom support beams each include two wheels configured to move the support structure, and the side supports are connected by a lateral support beam;
   a pair of cranes arranged on the lateral support beam, each crane of the pair having an arm arranged over the interior space;
   a spreader beam attached to the arms of each of crane of the pair by a respective crane cable such that the respective crane cables can raise and lower the spreader beam relative to the support structure, the spreader beam including a lift assembly configured to lift and inflate the balloon envelope within the interior space;
   a platform having a pair of lateral support bars, each lateral support bar of the pair being connected to each of the top support beams by a respective support bar cable such that the respective support bar cables can be operated to raise and lower the platform relative to the interior space; and
   a door assembly attached to the support structure, the door assembly including first, second, and third hangar doors configured to block wind from a respective direction of each hangar door entering the interior space during lifting and inflating of the balloon envelope.

2. The system of claim 1, wherein the platform includes a perch having a first end including a releasable restraint, a second end of the perch being configured to pivot relative to the platform in order to move the releasable restraint away from the platform.

3. The system of claim 1, wherein a first end of the perch includes a releasable restraint for temporarily securing the balloon envelope to the perch within the interior space during the inflating of the balloon envelope.

4. The system of claim 1, further comprising a lift gas supply apparatus configured to attach to a lift gas supply line of the lift assembly.

5. The system of claim 1, wherein the support structure includes four open sides defined by one of the side supports on a first of the open sides, one of the side beams of each of the side and the lateral support beam on a second of the four open sides, another of the two side supports on a third of the four open sides, and another of the side beams of each of the side structures on a fourth of the four open sides, the first hangar door is arranged to block wind from a direction of the first of the four open sides, the second hangar door is arranged to block wind from a direction of the second of the four open sides, and the third hangar door is arranged to block wind from a direction of the third of the four open sides.

6. The system of claim 5, wherein the door assembly includes a first side curtain between the first and second hangar doors and a second side curtain between the second and third hangar doors.

7. The system of claim 5, wherein the platform includes a perch configured to pivot relative to the platform in order to move the balloon towards the fourth of the four open sides after inflating the balloon envelope.

8. The system of claim 5, wherein the two wheels of each of the bottom support beams are configured to rotate the support structure in order to move the fourth of the open four sides downwind.

9. The system of claim 1, wherein each wheel of the two wheels of each of the bottom support beams includes an independent drive system such that each wheel of the two wheels of each of the bottom support beams can be rotated and pivoted independently of other wheels of the two wheels of each of the bottom support beams.

10. The system of claim 1, further comprising the balloon.

\* \* \* \* \*